US012657747B2

(12) United States Patent
Nishiyama et al.

(10) Patent No.: US 12,657,747 B2
(45) Date of Patent: Jun. 16, 2026

(54) IMAGING APPARATUS, IMAGING METHOD, AND PROGRAM

(71) Applicant: FUJIFILM Corporation, Tokyo (JP)

(72) Inventors: Yukinori Nishiyama, Saitama (JP); Shinya Fujiwara, Saitama (JP); Taro Saito, Saitama (JP); Takehiro Koguchi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 307 days.

(21) Appl. No.: 18/466,828

(22) Filed: Sep. 14, 2023

(65) Prior Publication Data

US 2023/0419520 A1 Dec. 28, 2023

Related U.S. Application Data

(63) Continuation of application No. PCT/JP2022/001632, filed on Jan. 18, 2022.

(30) Foreign Application Priority Data

Mar. 26, 2021 (JP) ................................. 2021-053830

(51) Int. Cl.
*G06T 7/50* (2017.01)
*G06T 7/70* (2017.01)
(Continued)

(52) U.S. Cl.
CPC .................. *G06T 7/50* (2017.01); *G06T 7/70* (2017.01); *H04N 23/675* (2023.01);
(Continued)

(58) Field of Classification Search
CPC ... G06T 7/50; G06T 7/70; G06T 2207/10028; G06T 2207/30244; H04N 23/675;
(Continued)

(56) References Cited

U.S. PATENT DOCUMENTS 5,754,899 A 5/1998 Taniguchi et al.
6,327,440 B1 12/2001 Taniguchi et al.
(Continued)

FOREIGN PATENT DOCUMENTS

CN 105629630 6/2016
JP H03163539 7/1991
(Continued)

OTHER PUBLICATIONS

"International Search Report (Form PCT/ISA/210) of PCT/JP2022/001632", mailed on Apr. 12, 2022, with English translation thereof, pp. 1-6.
(Continued)

*Primary Examiner* — Hung H Lam
(74) *Attorney, Agent, or Firm* — JCIPRNET

(57) ABSTRACT

There is provided an imaging apparatus including an image sensor, and a processor, in which the processor acquires first distance data related to a distance between the imaging apparatus and a first object included in a moving image, which is shown by moving image data obtained by being imaged by the image sensor, and second distance data related to a distance between the imaging apparatus and a second object included in the moving image, and controls a focus position according to whether or not a first object position in a depth direction based on the first distance data and a second object position in the depth direction based on the second distance data are within a depth of field.

20 Claims, 24 Drawing Sheets

(51) Int. Cl.
 H04N 23/67 (2023.01)
 H04N 25/704 (2023.01)

(52) U.S. Cl.
 CPC . H04N 25/704 (2023.01); G06T 2207/10028 (2013.01); G06T 2207/30244 (2013.01)

(58) Field of Classification Search
 CPC .... H04N 25/704; H04N 23/61; H04N 23/672; H04N 23/611; G02B 7/28; G02B 7/34; G03B 13/30; G03B 13/34; G03B 13/36
 See application file for complete search history.

(56) References Cited

U.S. PATENT DOCUMENTS

| | | | |
|---|---|---|---|
| 6,614,998 B1 | 9/2003 | Senba et al. | |
| 2011/0274420 A1* | 11/2011 | Yasuda | H04N 25/704 |
| | | | 396/125 |
| 2012/0027393 A1* | 2/2012 | Tsuda | H04N 23/675 |
| | | | 396/102 |
| 2014/0232928 A1 | 8/2014 | Ono | |
| 2018/0220059 A1 | 8/2018 | Takashima | |
| 2019/0339067 A1* | 11/2019 | Sanami | G06T 7/55 |
| 2020/0296296 A1 | 9/2020 | Chino et al. | |
| 2022/0321790 A1 | 10/2022 | Chino et al. | |
| 2023/0396882 A1* | 12/2023 | Fujiwara | H04N 23/611 |
| 2024/0196108 A1* | 6/2024 | Nakamura | H04N 23/958 |

FOREIGN PATENT DOCUMENTS

| | | |
|---|---|---|
| JP | 2001116980 | 4/2001 |
| JP | 2011211291 | 10/2011 |
| JP | 2015230414 | 12/2015 |
| JP | 2020154283 | 9/2020 |
| WO | 2013061947 | 5/2013 |
| WO | 2017057104 | 4/2017 |

OTHER PUBLICATIONS

"Written Opinion of the International Searching Authority (Form PCT/ISA/237) of PCT/JP2022/001632", mailed on Apr. 12, 2022, with English translation thereof, pp. 1-8.

"International Preliminary Examining Authorities (Form PCT/IPEA/408) of PCT/JP2022/001632", mailed on Aug. 23, 2022, with English translation thereof, pp. 1-11.

"International Preliminary Report On Patentability (Form PCT/IPEA/409) of PCT/JP2022/001632", completed on Nov. 28, 2022, with English translation thereof, pp. 1-10.

* cited by examiner

[REAR SURFACE VIEW]

Figure 4:
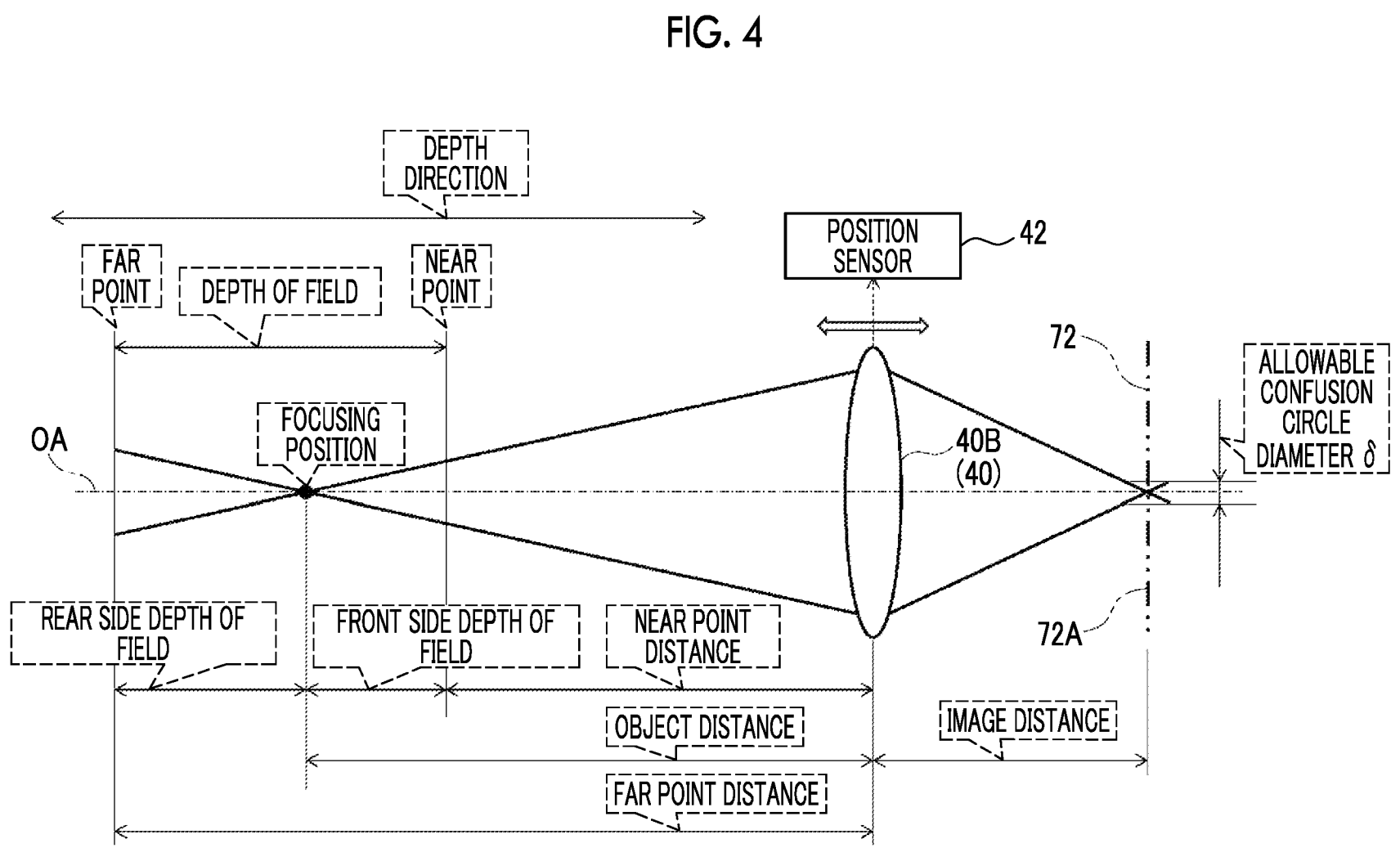

ALLOWABLE CONFUSION CIRCLE DIAMETER δ

72

72A 40B (40)

42

POSITION SENSOR

IMAGE DISTANCE

NEAR POINT DISTANCE

OBJECT DISTANCE

FAR POINT DISTANCE

DEPTH DIRECTION

NEAR POINT

FOCUSING POSITION

FRONT SIDE DEPTH OF FIELD

DEPTH OF FIELD

FAR POINT

REAR SIDE DEPTH OF FIELD

Figure 5:
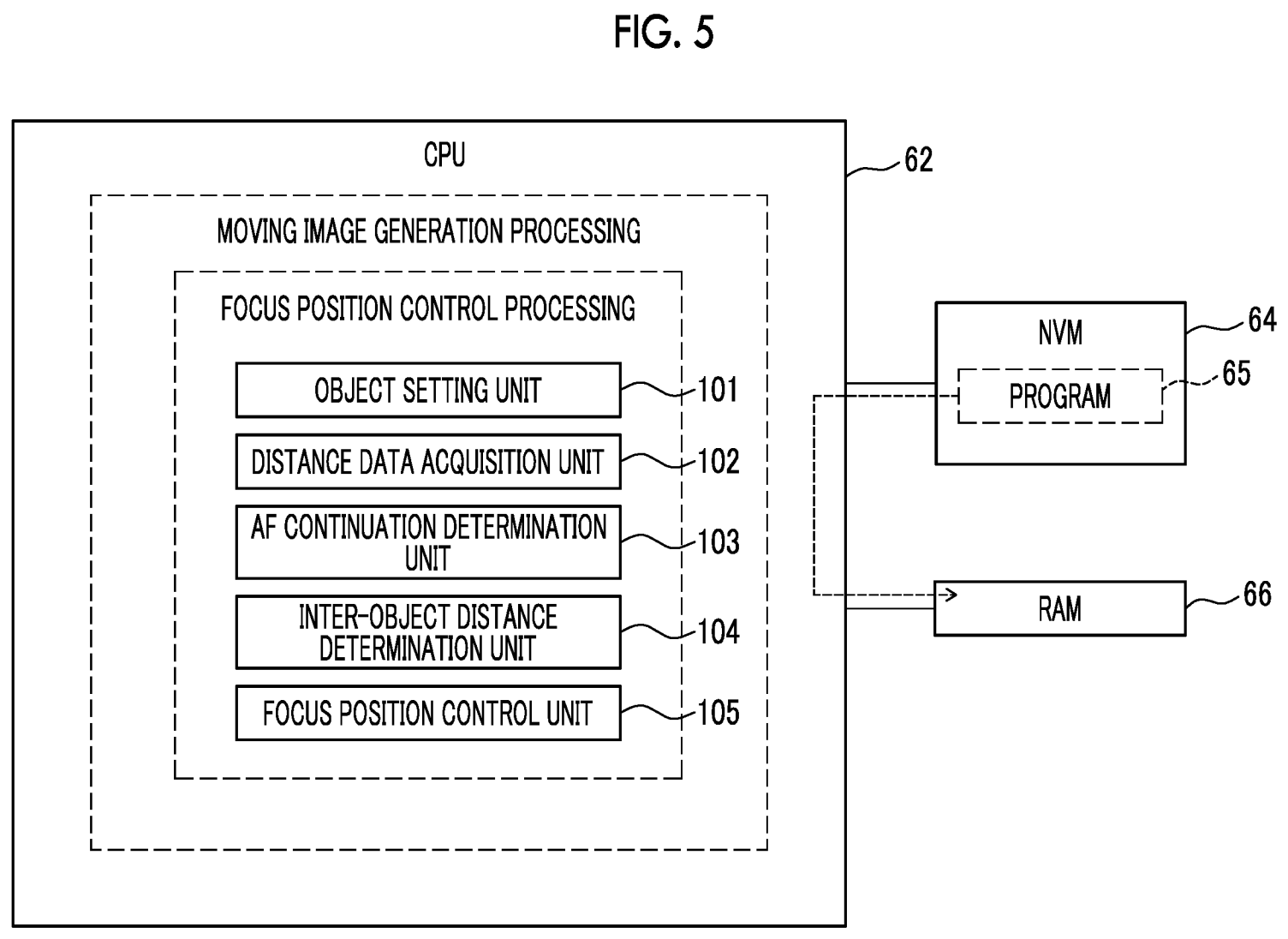

CPU — 62

MOVING IMAGE GENERATION PROCESSING

FOCUS POSITION CONTROL PROCESSING

OBJECT SETTING UNIT — 101

DISTANCE DATA ACQUISITION UNIT — 102

AF CONTINUATION DETERMINATION UNIT — 103

INTER-OBJECT DISTANCE DETERMINATION UNIT — 104

FOCUS POSITION CONTROL UNIT — 105

NVM — 64

PROGRAM — 65

RAM — 66

Figure 10:
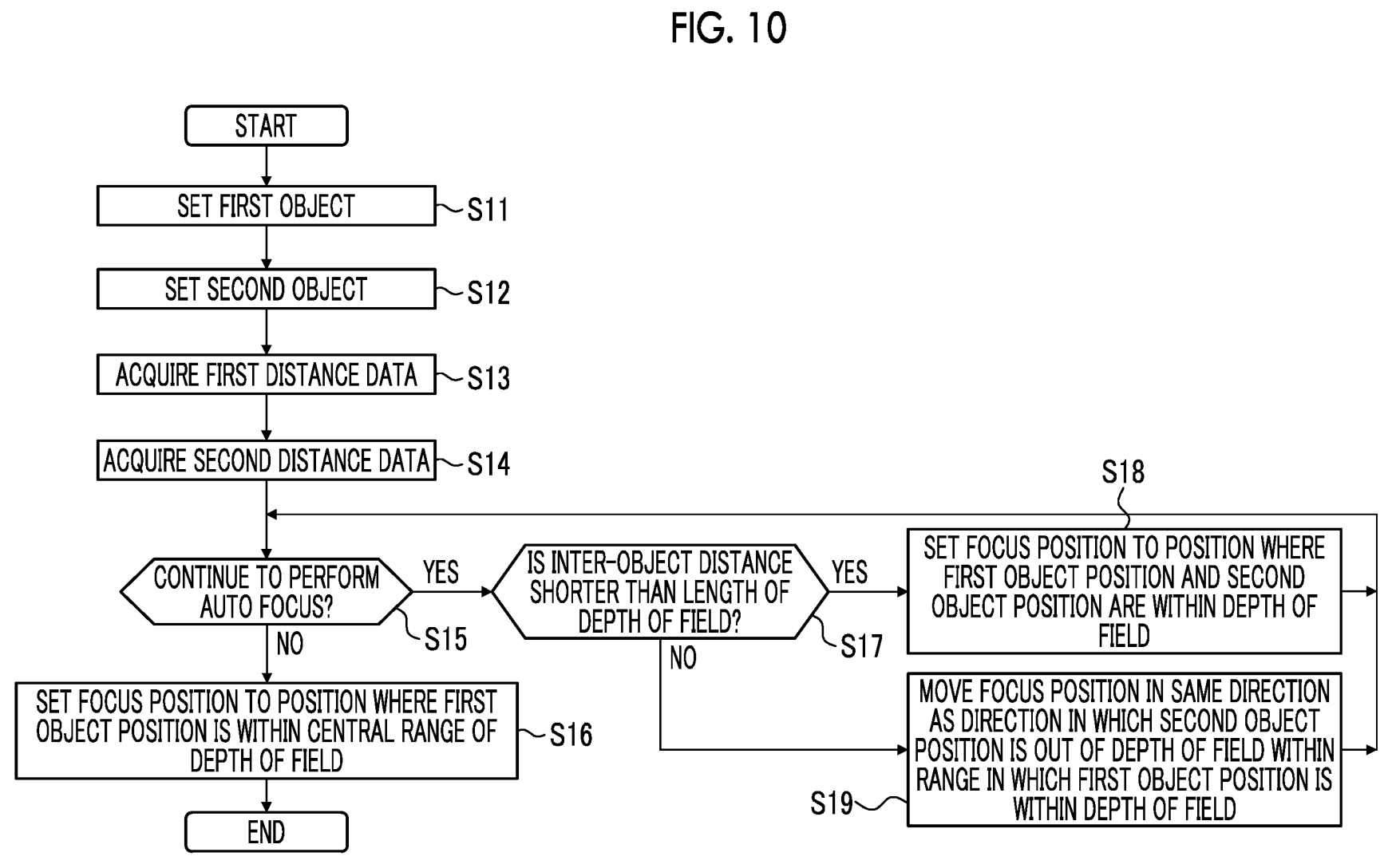

START

SET FIRST OBJECT — S11

SET SECOND OBJECT — S12

ACQUIRE FIRST DISTANCE DATA — S13

ACQUIRE SECOND DISTANCE DATA — S14

CONTINUE TO PERFORM AUTO FOCUS? — S15

YES

IS INTER-OBJECT DISTANCE SHORTER THAN LENGTH OF DEPTH OF FIELD? — S17

YES

SET FOCUS POSITION TO POSITION WHERE FIRST OBJECT POSITION AND SECOND OBJECT POSITION ARE WITHIN DEPTH OF FIELD — S18

NO

MOVE FOCUS POSITION IN SAME DIRECTION AS DIRECTION IN WHICH SECOND OBJECT POSITION IS OUT OF DEPTH OF FIELD WITHIN RANGE IN WHICH FIRST OBJECT POSITION IS WITHIN DEPTH OF FIELD — S19

NO

SET FOCUS POSITION TO POSITION WHERE FIRST OBJECT POSITION IS WITHIN CENTRAL RANGE OF DEPTH OF FIELD — S16

END

FIG. 13

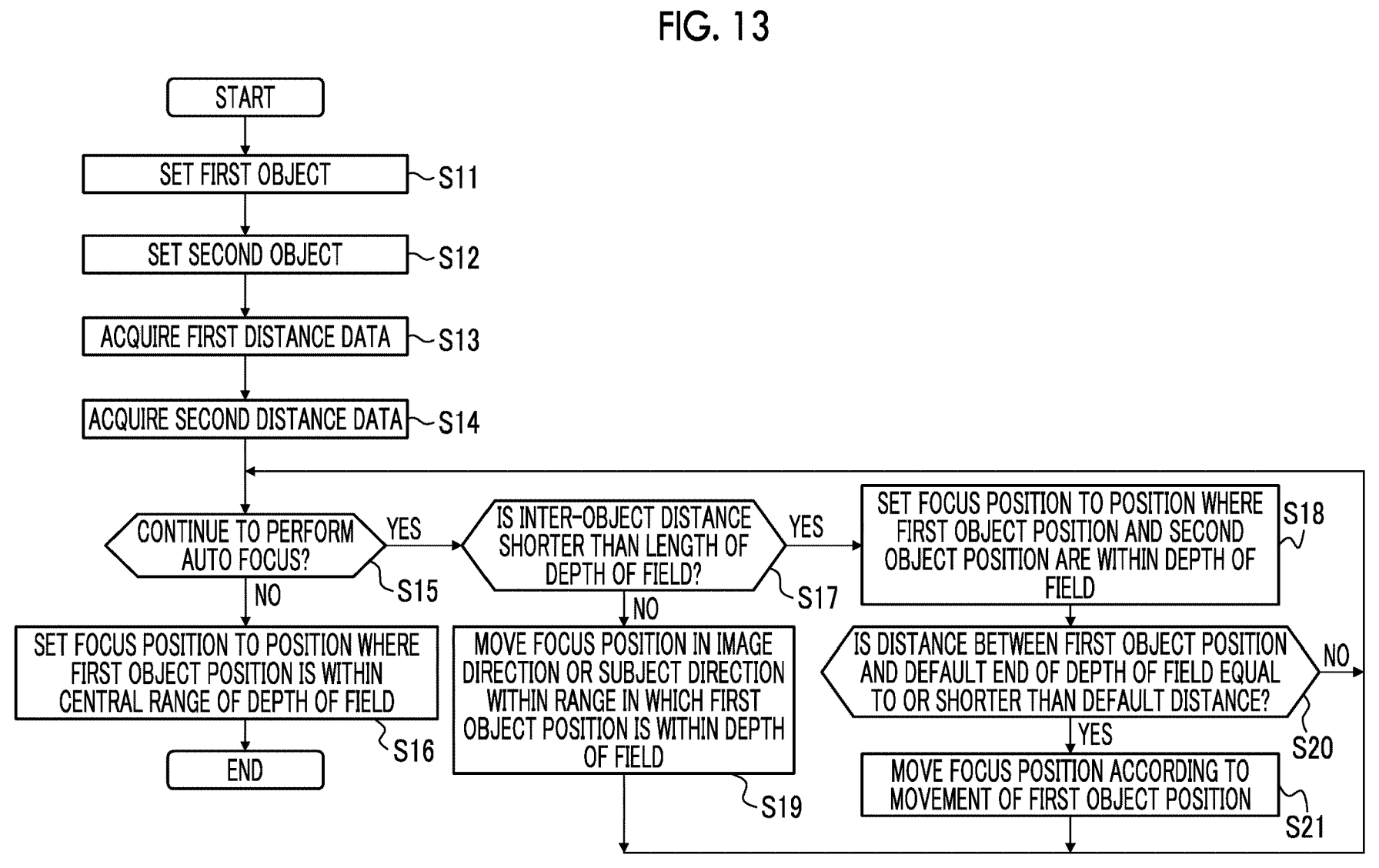

START

SET FIRST OBJECT — S11

SET SECOND OBJECT — S12

ACQUIRE FIRST DISTANCE DATA — S13

ACQUIRE SECOND DISTANCE DATA — S14

CONTINUE TO PERFORM AUTO FOCUS? — S15

NO → SET FOCUS POSITION TO POSITION WHERE FIRST OBJECT POSITION IS WITHIN CENTRAL RANGE OF DEPTH OF FIELD — S16 → END

YES → IS INTER-OBJECT DISTANCE SHORTER THAN LENGTH OF DEPTH OF FIELD? — S17

YES → SET FOCUS POSITION TO POSITION WHERE FIRST OBJECT POSITION AND SECOND OBJECT POSITION ARE WITHIN DEPTH OF FIELD — S18

NO → MOVE FOCUS POSITION IN IMAGE DIRECTION OR SUBJECT DIRECTION WITHIN RANGE IN WHICH FIRST OBJECT POSITION IS WITHIN DEPTH OF FIELD — S19

IS DISTANCE BETWEEN FIRST OBJECT POSITION AND DEFAULT END OF DEPTH OF FIELD EQUAL TO OR SHORTER THAN DEFAULT DISTANCE? — S20

NO

YES → MOVE FOCUS POSITION ACCORDING TO MOVEMENT OF FIRST OBJECT POSITION — S21

Figure 21:
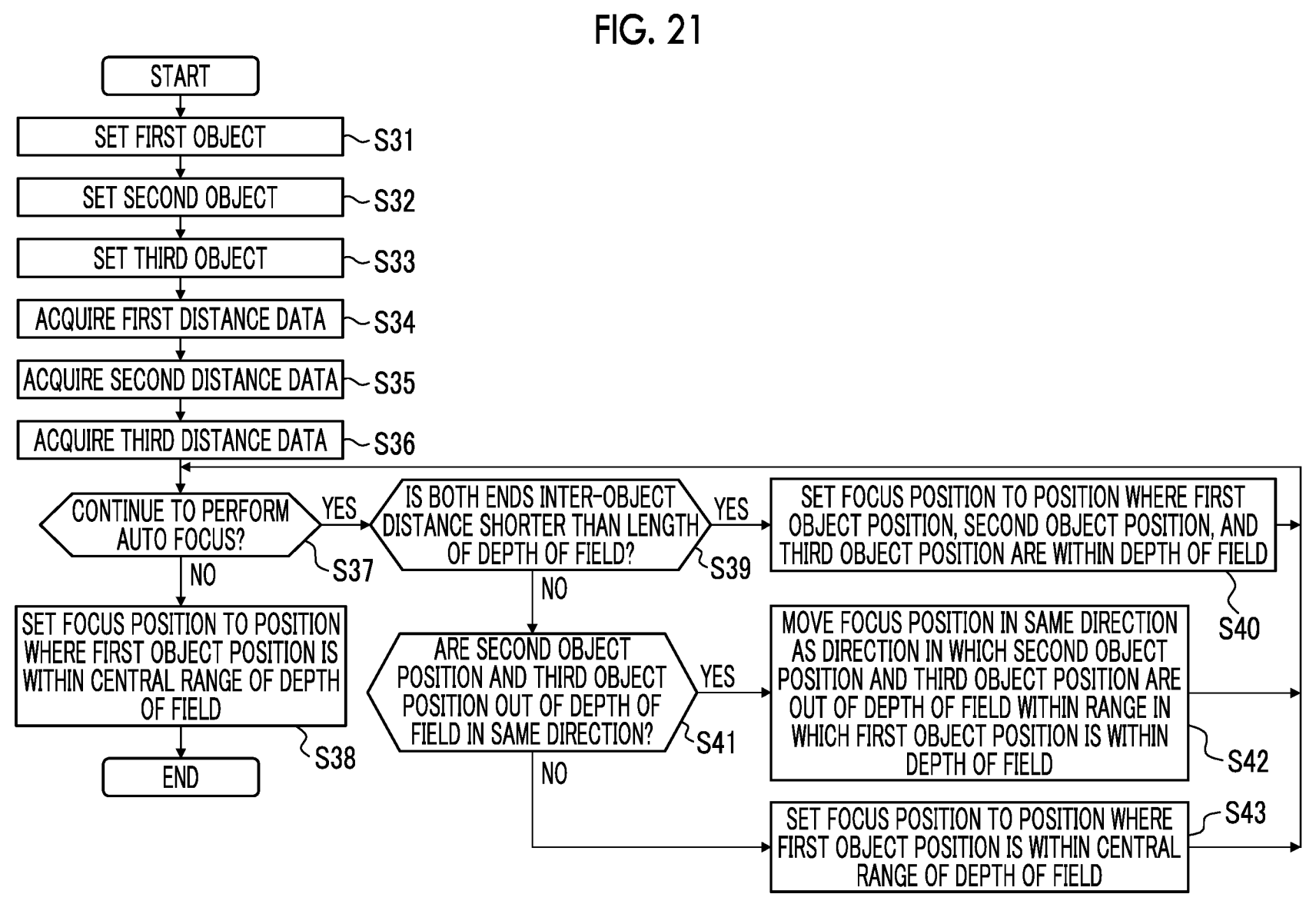

START

SET FIRST OBJECT ~S31

SET SECOND OBJECT ~S32

SET THIRD OBJECT ~S33

ACQUIRE FIRST DISTANCE DATA ~S34

ACQUIRE SECOND DISTANCE DATA ~S35

ACQUIRE THIRD DISTANCE DATA ~S36

CONTINUE TO PERFORM AUTO FOCUS? ~S37

YES

IS BOTH ENDS INTER-OBJECT DISTANCE SHORTER THAN LENGTH OF DEPTH OF FIELD? ~S39

YES

SET FOCUS POSITION TO POSITION WHERE FIRST OBJECT POSITION, SECOND OBJECT POSITION, AND THIRD OBJECT POSITION ARE WITHIN DEPTH OF FIELD ~S40

NO

ARE SECOND OBJECT POSITION AND THIRD OBJECT POSITION OUT OF DEPTH OF FIELD IN SAME DIRECTION? ~S41

YES

MOVE FOCUS POSITION IN SAME DIRECTION AS DIRECTION IN WHICH SECOND OBJECT POSITION AND THIRD OBJECT POSITION ARE OUT OF DEPTH OF FIELD WITHIN RANGE IN WHICH FIRST OBJECT POSITION IS WITHIN DEPTH OF FIELD ~S42

NO

SET FOCUS POSITION TO POSITION WHERE FIRST OBJECT POSITION IS WITHIN CENTRAL RANGE OF DEPTH OF FIELD ~S43

NO

SET FOCUS POSITION TO POSITION WHERE FIRST OBJECT POSITION IS WITHIN CENTRAL RANGE OF DEPTH OF FIELD ~S38

END

IMAGING APPARATUS, IMAGING METHOD, AND PROGRAM

This application is a continuation application of International Application No. PCT/JP2022/001632, filed Jan. 18, 2022, the disclosure of which is incorporated herein by reference in its entirety. Further, this application claims priority under 35 USC 119 from Japanese Patent Application No. 2021-053830 filed Mar. 26, 2021, the disclosure of which is incorporated by reference herein.

BACKGROUND OF THE INVENTION

1. Field of the Invention

The present disclosed technology relates to an imaging apparatus, an imaging method, and a program.

2. Description of the Related Art

An imaging apparatus described in JP2020-154283A drives at least one of an imaging element or an imaging optical system, and includes a tilt control unit that performs tilt control, a focus lens drive unit that drives a focus lens, and a control unit, which includes a plurality of control modes for performing focus correction using at least one of the tilt control unit or the focus lens drive unit and selects one of the plurality of control modes according to the number of subject regions within an imaging screen.

An automatic focusing camera described in JP2001-116980A includes a measurement unit that is capable of measuring a plurality of movement positions of a focus lens or an imaging plane for separately focusing a plurality of subjects present within an imaging range, a focus adjustment unit that moves the focus lens or the imaging plane to a substantially central position of movement positions at both ends of the plurality of movement positions in a case where the plurality of movement positions are measured by the measurement unit, a stop adjustment unit that controls a stop such that a plurality of subjects are within a depth of field in a case where the plurality of subjects are formed with the focus lens or the imaging plane adjusted by the focus adjustment unit, and an imaging unit that performs imaging with the focus lens or the imaging plane and a stop, which are respectively adjusted by the focus adjustment unit and the stop adjustment unit.

A focus control device described in WO2017/057104A includes a plurality of signal detection units that receive a luminous flux, which has passed through an imaging optical system including a focus lens that can move in an optical axis direction within a first range, and detect a signal according to an amount of the received light, an allowable movement range control unit that controls an allowable movement range that allows movement of the focus lens set in the first range, and a lens drive control unit that moves the focus lens within the allowable movement range controlled by the allowable movement range control unit based on a signal group output from a plurality of signal detection units.

SUMMARY OF THE INVENTION

One embodiment according to the present disclosed technology provides, for example, in a case where a plurality of subjects are imaged, an imaging apparatus, an imaging method, and a program capable of suppressing a sudden change in a focus state even in a case where a subject is moved in a depth direction.

An imaging apparatus of the present disclosure comprises: an image sensor; and a processor, in which the processor is configured to: acquire first distance data related to a distance between the imaging apparatus and a first object included in a moving image, which is shown by moving image data obtained by being imaged by the image sensor, and second distance data related to a distance between the imaging apparatus and a second object included in the moving image; and control a focus position according to whether or not a first object position in a depth direction based on the first distance data and a second object position in the depth direction based on the second distance data are within a depth of field.

The processor may perform, in a case where the second object position is out of the depth of field in a first direction, control of moving the focus position in the first direction within a range in which the first object position is within the depth of field.

The processor may perform, in a case where the first object position and the second object position are within the depth of field, control of moving the focus position according to movement of the first object position in the depth direction.

The processor may perform, in a case where the first object position and the second object position are within the depth of field, control of associating the focus position with the first object position that is moved in the depth direction.

The processor may perform, in a case where the first object position and the second object position are within the depth of field, control of associating the focus position with the first object position on a condition in which a distance between the first object position and a default end of the depth of field is equal to or shorter than a default distance.

The processor may perform, in a case where the first object position and the second object position are within the depth of field, control of setting the focus position to a position where a position between the first object position and the second object position is within a first central range of the depth of field.

The position between the first object position and the second object position may be a central position between the first object position and the second object position.

The processor may perform, in a case where the first object position and the second object position are within the depth of field, control of setting the focus position to a position where a focusing position is set to a position between the first object position and the second object position.

The position between the first object position and the second object position may be a central position between the first object position and the second object position.

The processor may perform, in a case where a state in which the second object position is out of the depth of field continues for first default time or longer, control of setting the focus position to a position where the first object position is within a second central range of the depth of field.

The processor may perform, in a case where the depth of field is narrower than a default range, control of setting the focus position to a position where the first object position is within a third central range of the depth of field.

The processor may perform, in a case where a state in which the second object position is out of the depth of field and a state in which a distance between the first object position and the second object position is shorter than a length of the depth of field continue for second default time or longer, control of setting the focus position to a position where the first object position and the second object position are within the depth of field.

The processor may set an object, in which a default condition is satisfied among a plurality of objects specified from the moving image data, as the first object.

The default condition may be a condition in which an instruction is given from an outside or may be a condition in which detection is made as a default object by performing detection processing.

The processor may acquire third distance data related to a distance between the imaging apparatus and a third object included in the moving image and may perform, in a case where the second object position and a third object position in the depth direction based on the third distance data are out of the depth of field in a second direction, control of moving the focus position in the second direction within a range in which the first object position is within the depth of field.

The processor may perform, in a case where the second object position is out of the depth of field in a third direction and the third object position is out of the depth of field in a fourth direction, control of setting the focus position to a position where the first object position is within a fourth central range of the depth of field.

The processor may perform, in a case where the second object position is out of the depth of field, control of increasing the depth of field by changing a stop amount.

The control of increasing the depth of field by changing the stop amount may be control of changing the stop amount to an amount in which the first object position and the second object position are within the depth of field.

The processor may acquire the first distance data and the second distance data based on imaging data output from the image sensor.

The image sensor may include a plurality of phase difference pixels, and the processor may acquire the first distance data and the second distance data based on phase difference pixel data, of the imaging data, output from the phase difference pixels.

The phase difference pixel may be a pixel for selectively outputting non-phase difference pixel data and the phase difference pixel data, the non-phase difference pixel data may be pixel data obtained by performing photoelectric conversion in an entire region of the phase difference pixels, and the phase difference pixel data may be pixel data obtained by performing the photoelectric conversion in a partial region of the phase difference pixels.

An imaging method of the present disclosure comprises: acquiring first distance data related to a distance between an imaging apparatus and a first object included in a moving image, which is shown by moving image data obtained by being imaged by an image sensor, and second distance data related to a distance between the imaging apparatus and a second object included in the moving image; and controlling a focus position according to whether or not a first object position in a depth direction based on the first distance data and a second object position in the depth direction based on the second distance data are within a depth of field.

A program of the present disclosure that causes a computer to execute a process comprises: acquiring first distance data related to a distance between an imaging apparatus and a first object included in a moving image, which is shown by moving image data obtained by being imaged by an image sensor, and second distance data related to a distance between the imaging apparatus and a second object included in the moving image; and controlling a focus position according to whether or not a first object position in a depth direction based on the first distance data and a second object position in the depth direction based on the second distance data are within a depth of field.

BRIEF DESCRIPTION OF THE DRAWINGS

FIG. 2 is a schematic configuration diagram showing an example of hardware configurations of an optical system and an electrical system of the imaging apparatus according to the first embodiment.

FIG. 4 is an explanatory diagram illustrating an example of a relationship between a depth of field and a focus lens according to the first embodiment.

FIG. 5 is a block diagram showing an example of a functional configuration of a CPU according to the first embodiment.

FIG. 6 is an explanatory diagram showing an example of a first operation example of the imaging apparatus according to the first embodiment.

FIG. 10 is a flowchart showing an example of a flow of focus position control processing executed by the CPU according to the first embodiment.

FIG. 13 is a flowchart showing an example of a flow of the focus position control processing executed by the CPU according to the second embodiment.

FIG. 14 is an explanatory diagram showing an example of an operation example of the imaging apparatus according to a third embodiment.

FIG. 21 is a flowchart showing an example of a flow of the focus position control processing executed by the CPU according to the sixth embodiment.

FIG. 22 is an explanatory diagram showing an example of a first operation example of the imaging apparatus according to a seventh embodiment.

Figure 23:
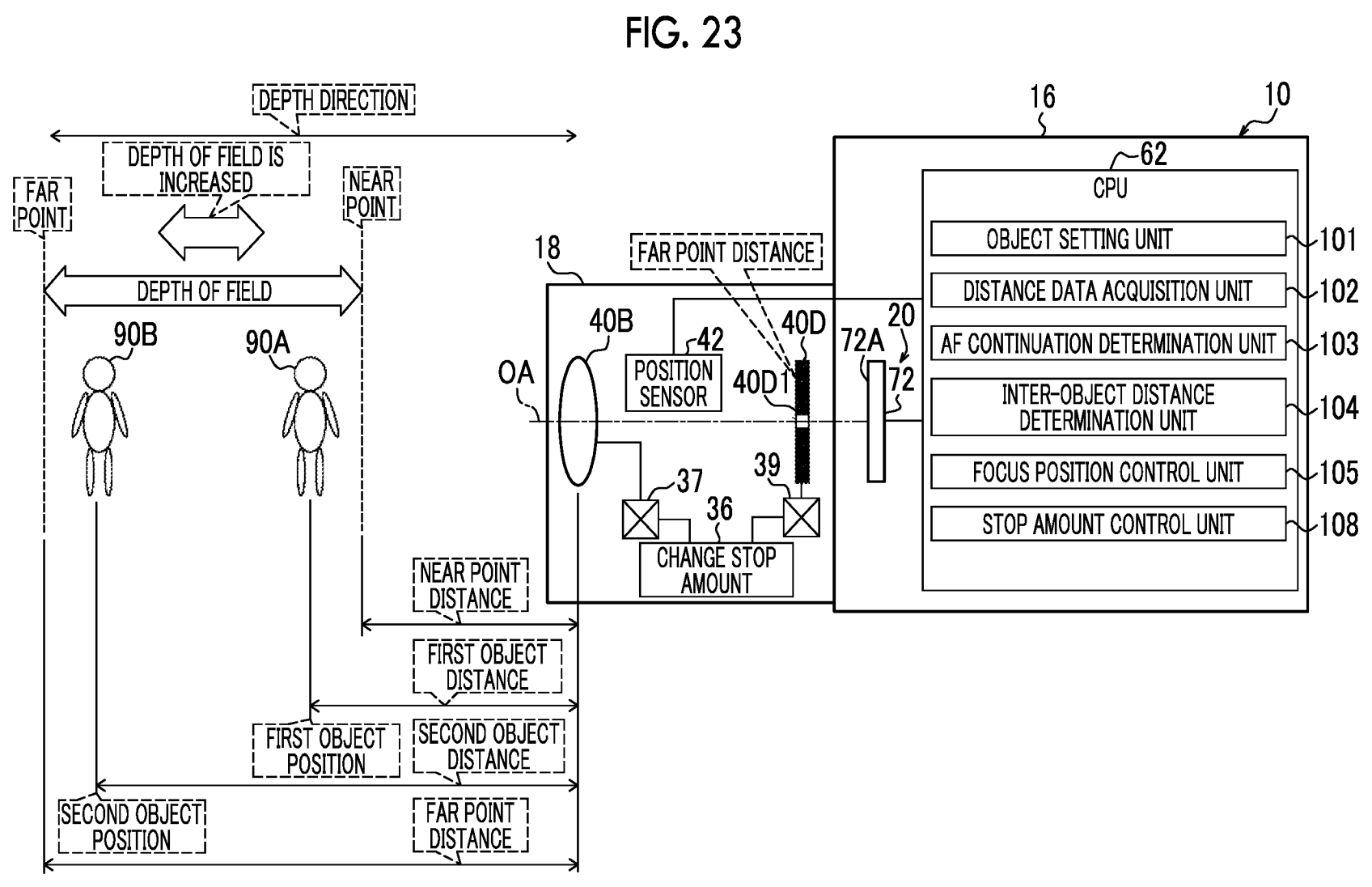

FIG. 23 is an explanatory diagram showing an example of a second operation example of the imaging apparatus according to the seventh embodiment.

DESCRIPTION OF THE PREFERRED EMBODIMENTS

Hereinafter, an example of an imaging apparatus, an imaging method, and a program according to the present disclosed technology will be described with reference to the accompanying drawings.

First, the wording used in the following description will be described.

CPU refers to an abbreviation of a "Central Processing Unit". GPU refers to an abbreviation of a "Graphics Processing Unit". TPU refers to an abbreviation of a "Tensor processing unit". NVM refers to an abbreviation of a "Nonvolatile memory". RAM refers to an abbreviation of a "Random Access Memory". IC refers to an abbreviation of an "Integrated Circuit". ASIC refers to an abbreviation of an "Application Specific Integrated Circuit". PLD refers to an abbreviation of a "Programmable Logic Device". FPGA refers to an abbreviation of a "Field-Programmable Gate Array". SoC refers to an abbreviation of a "System-on-a-chip". SSD refers to an abbreviation of a "Solid State Drive". USB refers to an abbreviation of a "Universal Serial Bus". HDD refers to an abbreviation of a "Hard Disk Drive". EEPROM refers to an abbreviation of an "Electrically Erasable and Programmable Read Only Memory". EL refers to an abbreviation of "Electro-Luminescence". OF refers to an abbreviation of an "Interface". UI refers to an abbreviation of a "User Interface". fps refers to an abbreviation of a "frame per second". MF refers to an abbreviation of "Manual Focus". AF refers to an abbreviation of "Auto Focus". CMOS refers to an abbreviation of a "Complementary Metal Oxide Semiconductor". CCD refers to an abbreviation of a "Charge Coupled Device". A/D refers to an abbreviation of "Analog/Digital". PC refers to an abbreviation of "Personal Computer". AI refers to an abbreviation of "Artificial Intelligence". TOF refers to an abbreviation of "Time of Flight".

In the present specification, the "parallel" indicates a parallel in the sense of including an error generally allowed in the technical field, to which the present disclosed technology belongs, in addition to the perfect parallel, and an error that does not go against the gist of the present disclosed technology. Further, in the description of the present specification, the meaning of "coinciding with each other" includes not only "completely coinciding with each other" but also "coinciding with each other with an error generally acceptable in a technical field to which the present disclosed technology belongs to an extent that is not inconsistent with the gist of the present disclosed technology".

First Embodiment

Figure 1:
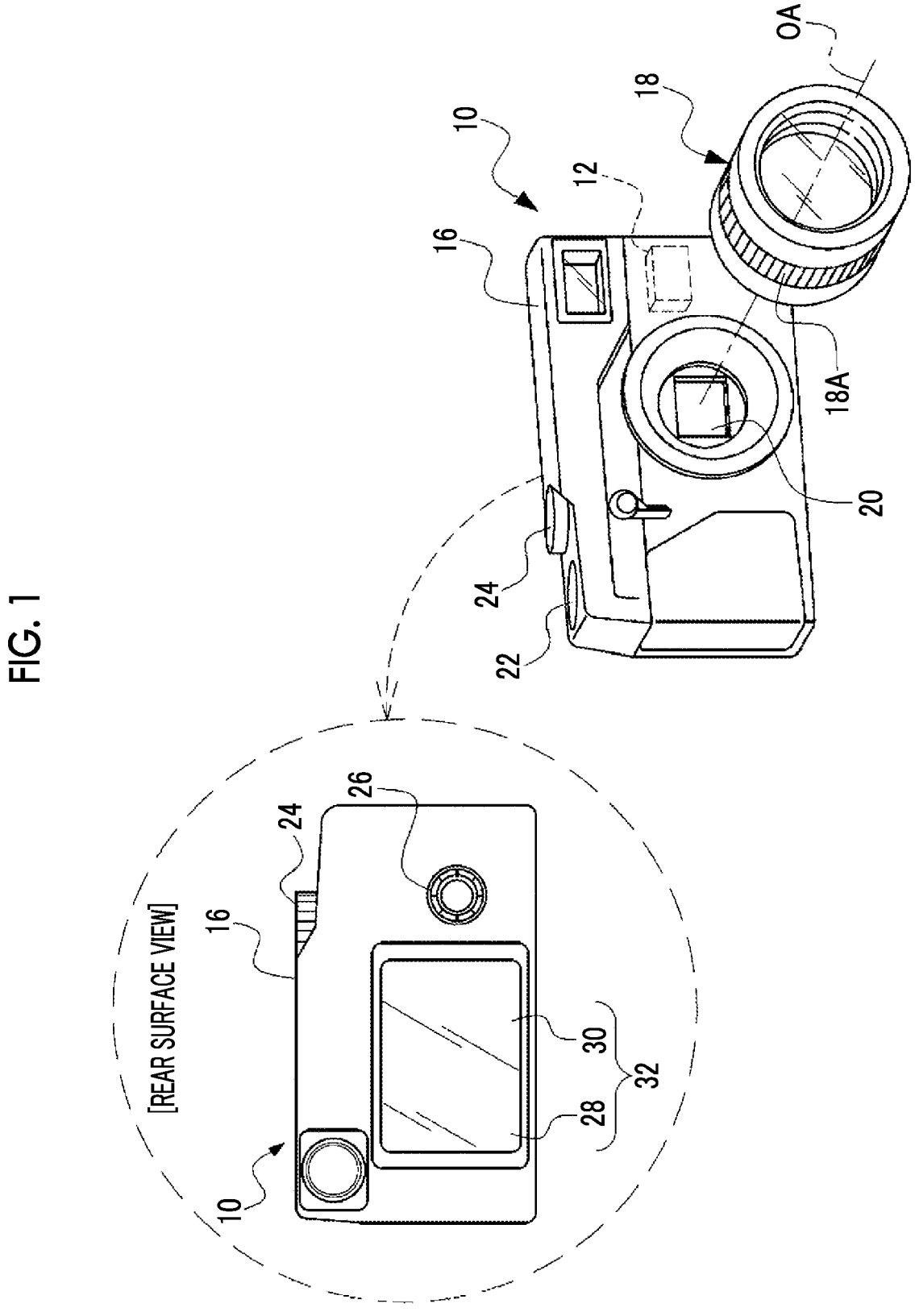
FIG. 1 is a schematic configuration diagram showing an example of a configuration of an imaging apparatus according to a first embodiment.

As an example shown in FIG. 1, the imaging apparatus 10 is an apparatus for imaging a subject and includes a controller 12, an imaging apparatus main body 16, and an interchangeable lens 18. The imaging apparatus 10 is an example of an "imaging apparatus" according to the present disclosed technology, and the controller 12 is an example of a "computer" according to the present disclosed technology. The controller 12 is built into the imaging apparatus main body 16 and controls the entire imaging apparatus 10. The interchangeable lens 18 is interchangeably attached to the imaging apparatus main body 16. The interchangeable lens 18 is provided with a focus ring 18A. In a case where a user or the like of the imaging apparatus 10 (hereinafter, simply referred to as the "user") manually adjusts the focus on the subject through the imaging apparatus 10, the focus ring 18A is operated by the user or the like.

In the example shown in FIG. 1, a lens-interchangeable digital camera is shown as an example of the imaging apparatus 10. However, the present example is only an example, and the imaging apparatus 10 may be a digital camera with a fixed lens or may be a digital camera, which is built into various electronic devices such as a smart device, a wearable terminal, a cell observation device, an ophthalmologic observation device, or a surgical microscope.

An image sensor 20 is provided in the imaging apparatus main body 16. The image sensor 20 is an example of an "image sensor" according to the present disclosed technology. The image sensor 20 is a CMOS image sensor. The image sensor 20 captures an imaging area including at least one subject. In a case where the interchangeable lens 18 is attached to the imaging apparatus main body 16, subject light indicating the subject is transmitted through the interchangeable lens 18 and imaged on the image sensor 20, and then image data indicating an image of the subject is generated by the image sensor 20.

In the first embodiment, although the CMOS image sensor is exemplified as the image sensor 20, the present disclosed technology is not limited to this, for example, the present disclosed technology is established even in a case where the image sensor 20 is another type of image sensor such as a CCD image sensor.

A release button 22 and a dial 24 are provided on an upper surface of the imaging apparatus main body 16. The dial 24 is operated in a case where an operation mode of an imaging system, an operation mode of a playback system, and the like are set, and by operating the dial 24, an imaging mode, a playback mode, and a setting mode are selectively set as the operation mode in the imaging apparatus 10. The imaging mode is an operation mode in which the imaging is performed with respect to the imaging apparatus 10. The playback mode is an operation mode for playing the image (for example, a still image and/or a moving image) obtained by the imaging for recording in the imaging mode. The setting mode is an operation mode for setting the imaging apparatus 10 in a case where various set values used in the control related to the imaging are set.

The release button 22 functions as an imaging preparation instruction unit and an imaging instruction unit, and is capable of detecting a two-step pressing operation of an imaging preparation instruction state and an imaging instruction state. The imaging preparation instruction state refers to a state in which the release button 22 is pressed, for example, from a standby position to an intermediate position (half pressed position), and the imaging instruction state refers to a state in which the release button 22 is pressed to a final pressed position (fully pressed position) beyond the intermediate position. In the following, the "state of being pressed from the standby position to the half pressed position" is referred to as a "half pressed state", and the "state of being pressed from the standby position to the fully pressed position" is referred to as a "fully pressed state". Depending on the configuration of the imaging apparatus 10, the imaging preparation instruction state may be a state in which the user's finger is in contact with the release button 22, and the imaging instruction state may be a state in which the operating user's finger is moved from the state of being in contact with the release button 22 to the state of being away from the release button 22.

An instruction key 26 and a touch panel display 32 are provided on a rear surface of the imaging apparatus main body 16. The touch panel display 32 includes a display 28 and a touch panel 30 (see also FIG. 2). Examples of the display 28 include an EL display (for example, an organic EL display or an inorganic EL display). The display 28 may not be an EL display but may be another type of display such as a liquid crystal display.

The display 28 displays image and/or character information and the like. The display 28 is used for imaging for a live view image, that is, for displaying a live view image obtained by performing the continuous imaging in a case where the imaging apparatus 10 is in the imaging mode. Here, the "live view image" refers to a moving image for display based on the image data obtained by being imaged by the image sensor 20. The imaging, which is performed to obtain the live view image (hereinafter, also referred to as "imaging for a live view image"), is performed according to, for example, a frame rate of 60 fps. 60 fps is only an example, and a frame rate of fewer than 60 fps may be used, or a frame rate of more than 60 fps may be used.

The display 28 is also used for displaying a still image obtained by the imaging for a still image in a case where an instruction for performing the imaging for a still image is provided to the imaging apparatus 10 via the release button 22. Further, the display 28 is also used for displaying a playback image or the like in a case where the imaging apparatus 10 is in the playback mode. Further, the display 28 is also used for displaying a menu screen where various menus can be selected and displaying a setting screen for setting the various set values used in control related to the imaging in a case where the imaging apparatus 10 is in the setting mode.

The touch panel 30 is a transmissive touch panel and is superimposed on a surface of a display region of the display 28. The touch panel 30 receives the instruction from the user by detecting contact with an indicator such as a finger or a stylus pen. In the following, for convenience of explanation, the above-mentioned "fully pressed state" also includes a state in which the user turns on a softkey for starting the imaging via the touch panel 30.

In the first embodiment, although an out-cell type touch panel display in which the touch panel 30 is superimposed on the surface of the display region of the display 28 is exemplified as an example of the touch panel display 32, this is only an example. For example, as the touch panel display 32, an on-cell type or in-cell type touch panel display can be also applied.

The instruction key 26 receives various instructions. Here, the "various instructions" refer to, for example, various instructions such as an instruction for displaying the menu screen, an instruction for selecting one or a plurality of menus, an instruction for confirming a selected content, an instruction for erasing the selected content, zooming in, zooming out, frame forwarding, and the like. Further, these instructions may be provided by the touch panel 30.

Figure 2:
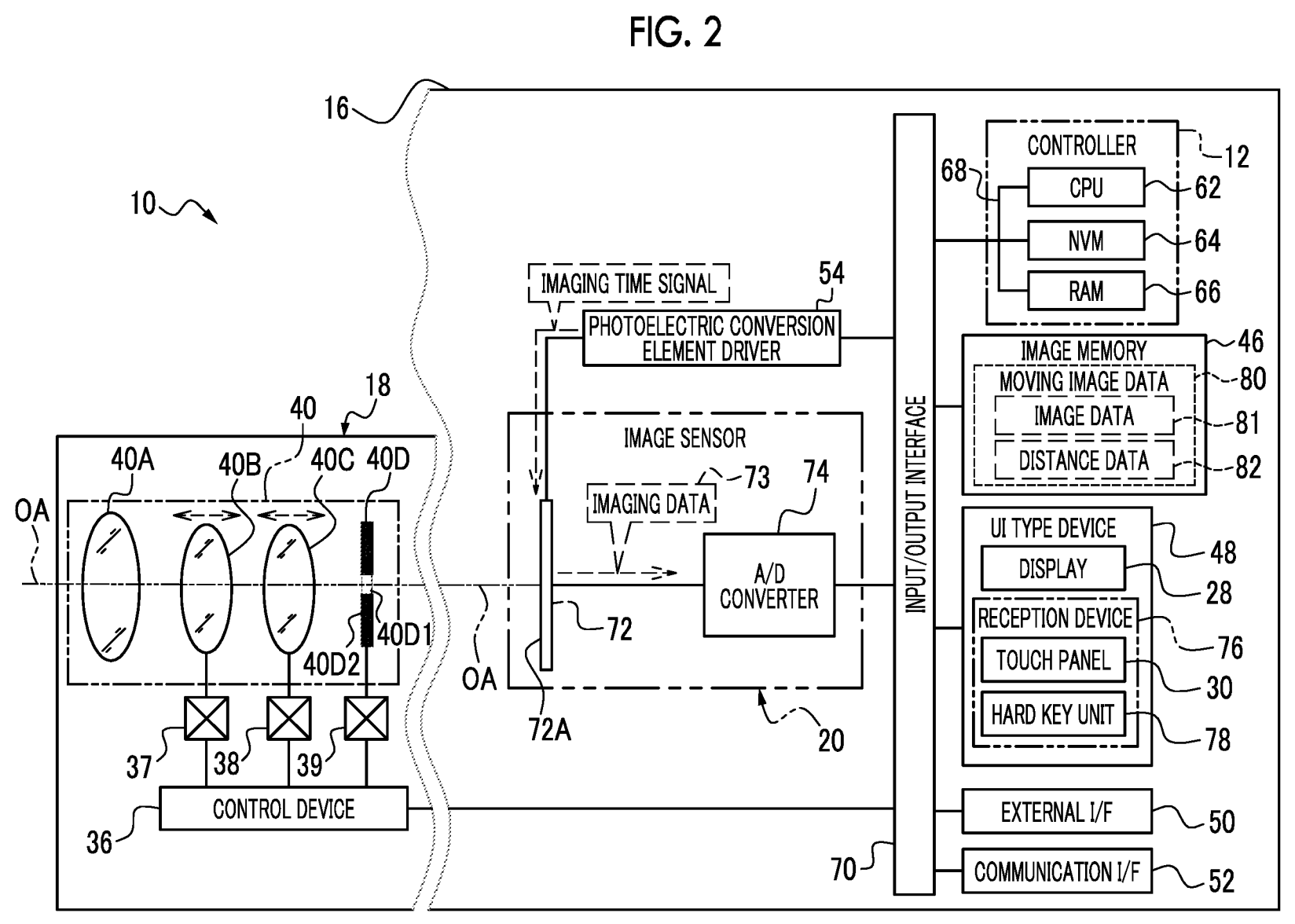

As an example shown in FIG. 2, the image sensor 20 includes photoelectric conversion elements 72. The photoelectric conversion elements 72 have a light-receiving surface 72A. The photoelectric conversion elements 72 are disposed in the imaging apparatus main body 16 such that the center of the light-receiving surface 72A and an optical axis OA coincide with each other (see also FIG. 1). The photoelectric conversion elements 72 have a plurality of photosensitive pixels 72B (see FIG. 3) arranged in a matrix shape, and the light-receiving surface 72A is formed by the plurality of photosensitive pixels 72B. Each photosensitive pixel 72B has a micro lens 72C (see FIG. 3). The photosensitive pixel 72B is a physical pixel having a photodiode (not shown), which photoelectrically converts the received light and outputs an electric signal according to a light receiving amount.

Further, red (R), green (G), or blue (B) color filters (not shown) are arranged in a matrix shape in a default pattern arrangement (for example, Bayer arrangement, RGB stripe arrangement, R/G checkered arrangement, X-Trans (registered trademark) arrangement, honeycomb arrangement, or the like) on the plurality of photosensitive pixels 72B.

The interchangeable lens 18 includes an imaging lens 40. The imaging lens 40 has an objective lens 40A, a focus lens 40B, a zoom lens 40C, and a stop 40D. The objective lens 40A, the focus lens 40B, the zoom lens 40C, and the stop 40D are disposed in the order of the objective lens 40A, the focus lens 40B, the zoom lens 40C, and the stop 40D along the optical axis OA from the subject side (object side) to the imaging apparatus main body 16 side (image side).

Further, the interchangeable lens 18 includes a control device 36, a first actuator 37, a second actuator 38, and a third actuator 39. The control device 36 controls the entire interchangeable lens 18 according to the instruction from the imaging apparatus main body 16. The control device 36 is a device having a computer including, for example, a CPU, an NVM, a RAM, and the like. The NVM of the control device 36 is, for example, an EEPROM. However, this is only an example, and an HDD and/or SSD or the like may be applied as the NVM of the control device 36 instead of or together with the EEPROM. Further, the RAM of the control device 36 temporarily stores various types of information and is used as a work memory. In the control device 36, the CPU reads out a necessary program from the NVM and executes the read various programs on the RAM to control the entire imaging lens 40.

Although a device having a computer is exemplified here as an example of the control device 36, this is only an example, and a device including an ASIC, FPGA, and/or PLD may be applied. Further, as the control device 36, for example, a device implemented by a combination of a hardware configuration and a software configuration may be used.

The first actuator 37 includes a slide mechanism for focus (not shown) and a motor for focus (not shown). The focus lens 40B is attached to the slide mechanism for focus to be slidable along the optical axis OA. Further, the motor for focus is connected to the slide mechanism for focus, and the slide mechanism for focus operates by receiving the power of the motor for focus to move the focus lens 40B along the optical axis OA.

The second actuator 38 includes a slide mechanism for zoom (not shown) and a motor for zoom (not shown). The zoom lens 40C is attached to the slide mechanism for zoom to be slidable along the optical axis OA. Further, the motor for zoom is connected to the slide mechanism for zoom, and the slide mechanism for zoom operates by receiving the power of the motor for zoom to move the zoom lens 40C along the optical axis OA.

Here, although an example of the embodiment in which the slide mechanism for focus and the slide mechanism for zoom are provided separately has been described, this is only an example, and it may be an integrated type slide mechanism capable of realizing both focusing and zooming. Further, in this case, the power, which is generated by one motor, may be transmitted to the slide mechanism without using a motor for focus and a motor for zoom.

The third actuator 39 includes a power transmission mechanism (not shown) and a motor for stop (not shown). The stop 40D has an opening 40D1 and is a stop in which the size of the opening 40D1 is variable. The opening 40D1 is formed by a plurality of stop leaf blades 40D2, for example. The plurality of stop leaf blades 40D2 are connected to the power transmission mechanism. Further, the motor for stop is connected to the power transmission mechanism, and the power transmission mechanism transmits the power of the motor for stop to the plurality of stop leaf blades 40D2. The plurality of stop leaf blades 40D2 receives the power that is transmitted from the power transmission mechanism and changes the size of the opening 40D1 by being operated. By changing the size of the opening 40D1, the stop amount obtained by the stop 40D is changed, whereby the exposure is adjusted.

The motor for focus, the motor for zoom, and the motor for stop are connected to the control device 36, and the control device 36 controls each drive of the motor for focus, the motor for zoom, and the motor for stop. In the first embodiment, a stepping motor is adopted as an example of the motor for focus, the motor for zoom, and the motor for stop. Therefore, the motor for focus, the motor for zoom, and the motor for stop operate in synchronization with a pulse signal in response to a command from the control device 36. Although an example in which the motor for focus, the motor for zoom, and the motor for stop are provided in the interchangeable lens 18 has been described here, this is only an example, and at least one of the motor for focus, the motor for zoom, or the motor for stop may be provided in the imaging apparatus main body 16. The constituent and/or operation method of the interchangeable lens 18 can be changed as needed.

In the imaging apparatus 10, in the case of the imaging mode, an MF mode and an AF mode are selectively set according to the instructions provided to the imaging apparatus main body 16. The MF mode is an operation mode for manually focusing. In the MF mode, for example, by operating the focus ring 18A or the like by the user, the focus lens 40B is moved along the optical axis OA with the movement amount according to the operation amount of the focus ring 18A or the like, thereby the position of the focus is adjusted. AF is performed in the AF mode. The AF refers to processing of adjusting the position of the focus according to a signal obtained from the image sensor 20. For example, in the AF mode, a distance between the imaging apparatus 10 and the subject is calculated by the imaging apparatus main body 16, and the focus lens 40B is moved along the optical axis OA to a position where the subject is in focus, whereby the position of the focus is adjusted.

The imaging apparatus main body 16 includes the image sensor 20, the controller 12, an image memory 46, a UI type device 48, an external OF 50, a communication OF 52, a photoelectric conversion element driver 54, and an input/output interface 70. Further, the image sensor 20 includes the photoelectric conversion elements 72 and an A/D converter 74.

The controller 12, the image memory 46, the UI type device 48, the external OF 50, the communication OF 52, the photoelectric conversion element driver 54, and the A/D converter 74 are connected to the input/output interface 70. Further, the control device 36 of the interchangeable lens 18 is also connected to the input/output interface 70.

The controller 12 controls the entire imaging apparatus 10. That is, in the example shown in FIG. 2, the image memory 46, the UI type device 48, the external OF 50, the communication OF 52, the photoelectric conversion element driver 54, and the control device 36 are controlled by the controller 12. The controller 12 includes a CPU 62, an NVM 64, and a RAM 66. The CPU 62 is an example of a "processor" according to the present disclosed technology, and the NVM 64 and/or the RAM 66 are an example of a "memory" according to the present disclosed technology.

The CPU 62, the NVM 64, and the RAM 66 are connected via a bus 68, and the bus 68 is connected to the input/output interface 70. In the example shown in FIG. 2, one bus is shown as the bus 68 for convenience of illustration, but the bus 68 may be a plurality of buses. The bus 68 may be a serial bus or may be a parallel bus including a data bus, an address bus, a control bus, and the like.

The NVM 64 is a non-temporary storage medium that stores various parameters and various programs. The various programs include a program 65 (see FIG. 5), which will be described later. For example, the NVM 64 is an EEPROM. However, this is only an example, and an HDD and/or SSD or the like may be applied as the NVM 64 instead of or together with the EEPROM. Further, the RAM 66 temporarily stores various types of information and is used as a work memory. The CPU 62 reads out a necessary program from the NVM 64 and executes the read program in the RAM 66. The CPU 62 performs image processing according to a program executed on the RAM 66.

The photoelectric conversion element driver 54 is connected to the photoelectric conversion elements 72. The photoelectric conversion element driver 54 supplies an imaging time signal, which defines a time at which the imaging is performed by the photoelectric conversion elements 72, to the photoelectric conversion elements 72 according to an instruction from the CPU 62. The photoelectric conversion elements 72 perform reset, exposure, and output of an electric signal according to the imaging time signal supplied from the photoelectric conversion element driver 54. Examples of the imaging time signal include a vertical synchronization signal, and a horizontal synchronization signal.

In a case where the interchangeable lens 18 is attached to the imaging apparatus main body 16, the subject light incident on the imaging lens 40 is imaged on the light-receiving surface 72A by the imaging lens 40. Under the control of the photoelectric conversion element driver 54, the photoelectric conversion elements 72 photoelectrically convert the subject light, which is received from the light-receiving surface 72A, and output the electric signal corresponding to the amount of light of the subject light to the A/D converter 74 as imaging data 73 indicating the subject light. Specifically, the A/D converter 74 reads out the imaging data 73 from the photoelectric conversion elements 72 in units of one frame and for each horizontal line by using an exposure sequential reading out method.

The A/D converter 74 digitizes the analog imaging data 73 that is read from the photoelectric conversion element 72.

The imaging data 73, which is digitized by the A/D converter 74, is so-called RAW image data, and represents an image in which R pixels, G pixels, and B pixels are arranged in a mosaic shape. Further, in the first embodiment, as an example, the number of bits of each of the R pixel, the B pixel, and the G pixel included in the RAW image data, that is, the length of the bits is 14 bits.

The CPU 62 acquires the imaging data 73 from the A/D converter 74 and performs image processing on the acquired imaging data 73. The CPU 62 generates moving image data 80 based on the imaging data 73. The moving image data 80 is stored in the image memory 46. The moving image data 80 includes image data 81 used for displaying a live view image and distance data 82 related to a distance between the imaging apparatuses 10 of a plurality of subjects in an imaging area.

The UI type device 48 comprises a display 28. The CPU 62 displays the moving image data 80, which is stored in the image memory 46, on the display 28. Further, the CPU 62 displays various types of information on the display 28.

Further, the UI type device 48 includes a reception device 76 that receives an instruction from the user. The reception device 76 includes a touch panel 30 and a hard key unit 78. The hard key unit 78 is a plurality of hard keys including an instruction key 26 (see FIG. 1). The CPU 62 operates according to various instructions received by using the touch panel 30. Here, although the hard key unit 78 is included in the UI type device 48, the present disclosed technology is not limited to this, for example, the hard key unit 78 may be connected to the external OF 50.

The external OF 50 controls the exchange of various information between the imaging apparatus 10 and an apparatus existing outside the imaging apparatus 10 (hereinafter, also referred to as an "external apparatus"). Examples of the external OF 50 include a USB interface. The external apparatus (not shown) such as a smart device, a personal computer, a server, a USB memory, a memory card, and/or a printer is directly or indirectly connected to the USB interface.

The communication OF 52 is connected to a network (not shown). The communication OF 52 controls the exchange of information between a communication device (not shown) such as a server on the network and the controller 12. For example, the communication OF 52 transmits information in response to a request from the controller 12 to the communication device via the network. Further, the communication OF 52 receives the information transmitted from the communication device and outputs the received information to the controller 12 via the input/output interface 70.

Figure 3:
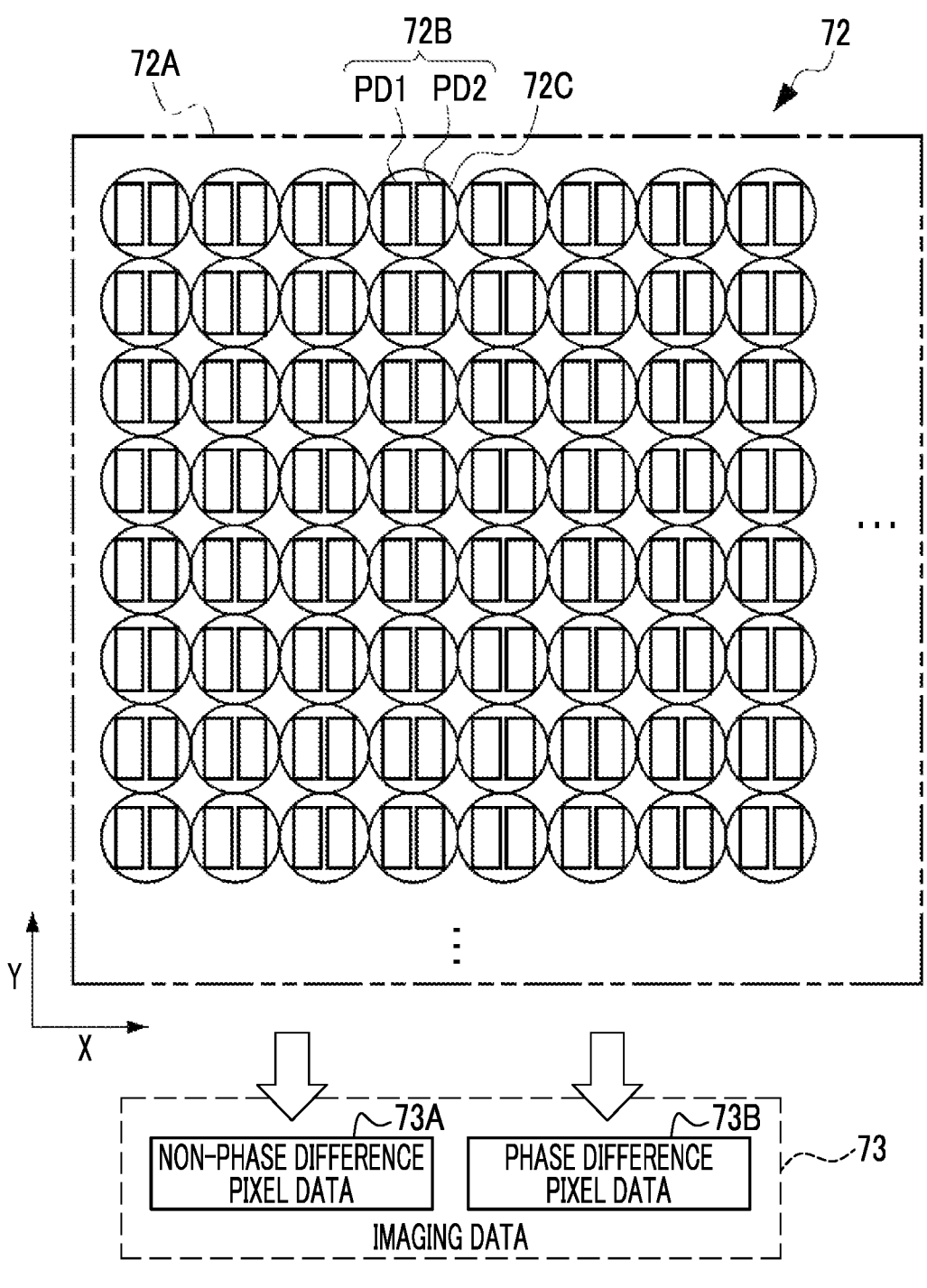
FIG. 3 is a schematic configuration diagram showing an example of a configuration of a photoelectric conversion element according to the first embodiment.

As an example shown in FIG. 3, the plurality of photosensitive pixels 72B are two-dimensionally arranged on the light-receiving surface 72A of the photoelectric conversion element 72. A color filter (not shown) and a micro lens 72C are disposed in each of the photosensitive pixels 72B. In FIG. 3, one direction that is parallel to the light-receiving surface 72A (for example, a row direction of the two-dimensionally arranged plurality of photosensitive pixels 72B) is defined as the X direction, and a direction that is orthogonal to the X direction (for example, a column direction of the two-dimensionally arranged plurality of photosensitive pixels 72B) is defined as the Y direction. The plurality of photosensitive pixels 72B are arranged along the X direction and the Y direction. Each photosensitive pixel 72B includes a pair of independent photodiodes PD1 and PD2. A first luminous flux (for example, a luminous flux passing through a first pupil portion region in the imaging lens 40 (see FIG. 2)), which is obtained by pupil-splitting a luminous flux (hereinafter also referred to as "subject luminous flux") indicating a subject transmitted through the imaging lens 40, is incident on the photodiode PD1, and a second luminous flux (for example, a luminous flux passing through a second pupil portion region in the imaging lens 40 (see FIG. 2)), which is obtained by pupil-splitting the subject luminous flux, is incident on the photodiode PD2.

The photodiode PD1 performs photoelectric conversion with respect to the first luminous flux. The photodiode PD2 performs photoelectric conversion with respect to the second luminous flux.

As an example, the photoelectric conversion element 72 is an image plane phase difference type photoelectric conversion element in which a pair of photodiodes PD1 and PD2 is provided in one photosensitive pixel 72B. As an example, the photoelectric conversion element 72 also has a function of outputting data that is related to the imaging and the phase difference with the photosensitive pixels 72B. In a case where imaging is performed in the imaging mode, the photoelectric conversion element 72 outputs non-phase difference pixel data 73A by combining the pair of photodiodes PD1 and PD2 into one photosensitive pixel 72B. Further, in the AF mode, the photoelectric conversion element 72 outputs phase difference pixel data 73B by detecting a signal from each of the pair of photodiodes PD1 and PD2. That is, all the photosensitive pixels 72B, which are provided in the photoelectric conversion element 72, are so-called phase difference pixels.

The photosensitive pixel 72B can selectively output the non-phase difference pixel data 73A and the phase difference pixel data. The non-phase difference pixel data 73A is pixel data obtained by performing the photoelectric conversion in the entire region of the photosensitive pixels 72B, and the phase difference pixel data 73B is pixel data obtained by performing the photoelectric conversion in a partial region of the photosensitive pixels 72B. Here, the "entire region of photosensitive pixels 72B" is a light-receiving region where the photodiode PD1 and the photodiode PD2 are combined. Further, a "partial region of photosensitive pixels 72B" is a light-receiving region of the photodiode PD1 or a light-receiving region of the photodiode PD2. The photosensitive pixel 72B is an example of a "phase difference pixel" according to the present disclosed technology.

The non-phase difference pixel data 73A can also be generated based on the phase difference pixel data 73B. For example, the non-phase difference pixel data 73A is generated by adding the phase difference pixel data 73B for each pair of pixel signals corresponding to the pair of photodiodes PD1 and PD2. Further, the phase difference pixel data 73B may include only data that is output from one of the pair of photodiodes PD1 or PD2. For example, in a case where the phase difference pixel data 73B includes only the data that is output from the photodiode PD1, it is possible to create data that is output from the photodiode PD2 by subtracting the phase difference pixel data 73B from the non-phase difference pixel data 73A for each pixel.

The image data 81 (that is, image data used for displaying the live view image) included in the moving image data 80 is generated based on the non-phase difference pixel data 73A. The distance data 82 (that is, distance data related to distances between the imaging apparatus 10 and the plurality of subjects in the imaging area) included in the moving image data 80 is generated based on the phase difference pixel data 73B.

As an example shown in FIG. 4, the imaging apparatus 10 includes a position sensor 42. The position sensor 42 detects a position of the focus lens 40B in an optical axis OA direction. An image distance is a distance along a depth direction from a main point of the imaging lens 40 to the light-receiving surface 72A of the photoelectric conversion element 72. The image distance is derived based on a detection result of the position sensor 42 by using a predetermined calculation formula or a data matching table. The depth direction is a direction parallel to the optical axis OA.

An object distance is a distance along the depth direction from the main point of the imaging lens 40 to a subject in an in-focus state. The subject in the in-focus state is positioned in a focusing position. The focusing position is a position that is most in focus. In a case where the object distance is defined as "L", "L" is calculated by using the following Equation (1). However, "t" is an image distance and is derived based on the detection result of the position sensor 42 as described above. Further, "f" is a focal length of the focus lens 40B and is a known fixed value.

$$L = \frac{tf}{t - f} \tag{1}$$

The depth of field of the imaging apparatus 10 has a rear side depth of field and a front side depth of field. In a case where the depth of field is defined as "D", "D" is calculated by using the following Equation (2). Further, in a case where the rear side depth of field is defined as "$D_r$", "$D_r$" is calculated by using the following Equation (3). Further, in a case where the front side depth of field is defined as "$D_f$", "$D_f$" is calculated by using the following Equation (4). However, "F" is a stop value of the stop 40D (see FIG. 2), that is, an F value, and "$\delta$" is an allowable confusion circle diameter. The F value is derived based on a detection result of a sensor (not shown) that detects a stop amount of the stop 40D. The allowable confusion circle diameter is a known fixed value. The allowable confusion circle diameter is substantially twice an arrangement pitch of the photosensitive pixels 72B (see FIG. 3) arranged in the light-receiving surface 72A, and a blurriness of a size of substantially one pixel is allowed. The allowable confusion circle diameter may be changed by a user using the UI type device 48 (see FIG. 2).

$$D = D_r + D_f \tag{2}$$

$$D_r = \frac{\delta F L^2}{f^2 - \delta F L} \tag{3}$$

$$D_f = \frac{\delta F L^2}{f^2 + \delta F L} \tag{4}$$

A near point distance is a distance along the depth direction from the main point of the imaging lens 40 to a near point of the depth of field. In a case where the near point distance is defined as "$L_n$", "$L_n$" is calculated by using the following Equation (5). A far point distance is a distance along the depth direction from the main point of the imaging lens 40 to a far point of the depth of field. In a case where the far point distance is defined as "$L_f$", "$L_f$" is calculated by using the following Equation (6).

$$L_n = \frac{f^2(L - f)}{f^2 + \delta F(L - f)} + f \tag{5}$$

-continued $$L_f = \frac{f^2(L - f)}{f^2 - \delta F(L - f)} + f \tag{6}$$

The above Equations (1) to (6) are used in focus position control processing described below.

As an example shown in FIG. 5, the program 65 is stored in the NVM 64. The program 65 is an example of a "program" according to the present disclosed technology. The CPU 62 reads out a program 65 from the NVM 64 and executes the read program 65 on the RAM 66. The CPU 62 performs moving image generation processing of generating the moving image data 80 based on the imaging data 73 (see FIG. 6) according to the program 65 executed on the RAM 66. Further, the moving image generation processing includes the focus position control processing. That is, in the moving image generation processing, the CPU 62 performs the focus position control processing described below. The focus position control processing is realized by the CPU 62 operating as an object setting unit 101, a distance data acquisition unit 102, an AF continuation determination unit 103, an inter-object distance determination unit 104, and a focus position control unit 105 according to the program 65.

Figure 6:
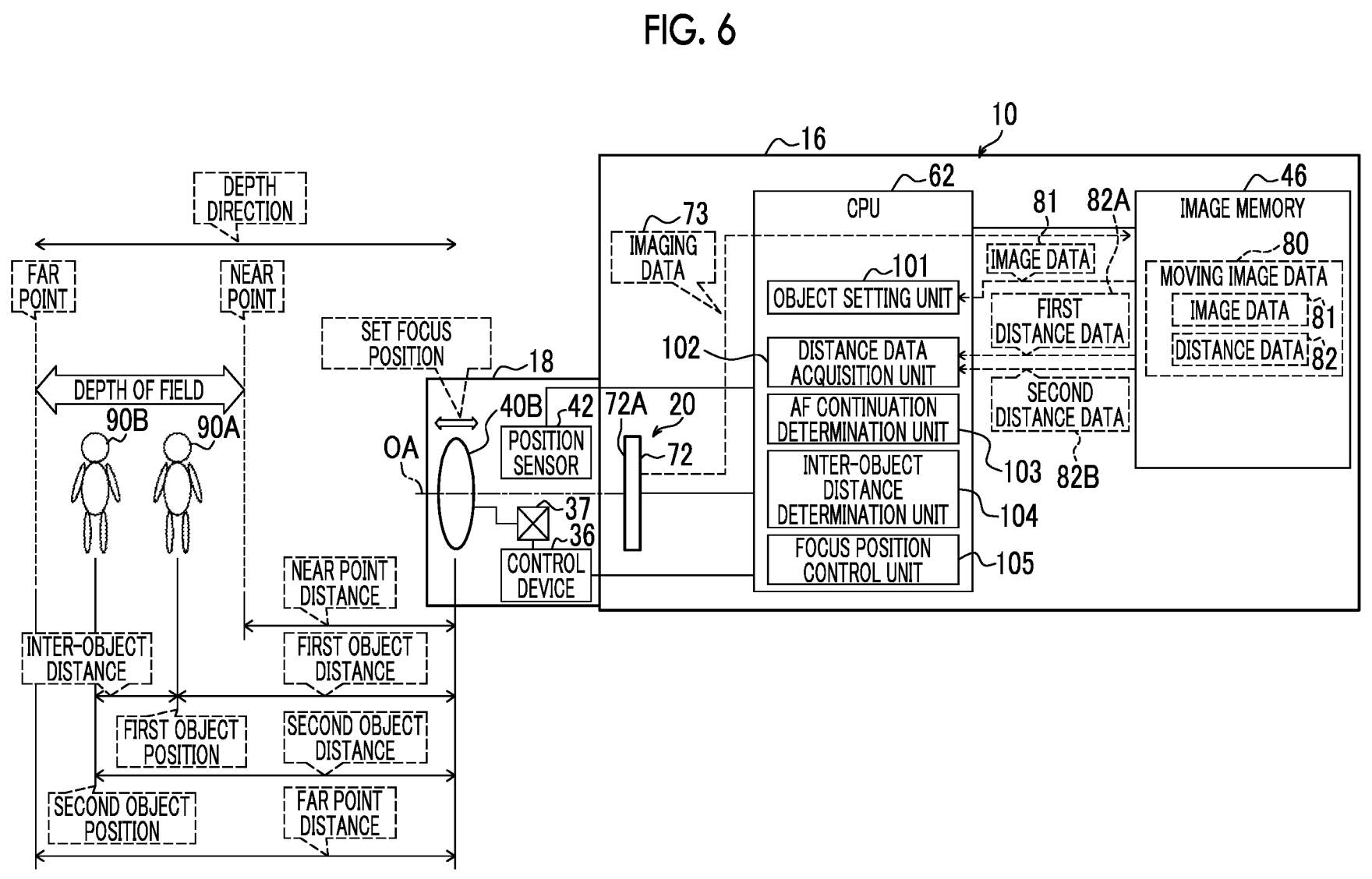

As an example shown in FIG. 6, the object setting unit 101 sets a first object and a second object to be focused in a plurality of objects included in the moving image indicated by the image data 81 based on the image data 81 included in the moving image data 80. Examples of the first object and the second object include a person, a person's face, a person's body, an animal, a car, and a fixed object. The first object and the second object may be objects of different types from each other. Further, at least any one of the first object or the second object may be an aggregate of a plurality of objects. Further, at least one of the first object or the second object may be an aggregate in which a plurality of types of objects are mixed. In the present specification, the object included in the image means an object included as an image in the image.

The object setting unit 101 may set an object, which is in focus at an imaging start time of the imaging apparatus 10 as the first object. Further, the object setting unit 101 may set the first object based on information registered in advance in the imaging apparatus 10. The object setting unit 101 sets an object, which is other than the object set as the first object, as the second object among the plurality of objects. Specific object setting processing, which is performed by the object setting unit 101, will be described with reference to the fifth embodiment described later.

In the example shown in FIG. 6, a plurality of objects 90A and 90B are shown as an example. As an example, each of the plurality of objects 90A and 90B represents a person. Hereinafter, an example in which the object 90A is set as a first object and the object 90B is set as a second object will be described. Hereinafter, the object 90A is referred to as a first object 90A, and the object 90B is referred to as a second object 90B. The first object 90A is an example of a "first object" according to the present disclosed technology, and the second object 90B is an example of a "second object" according to the present disclosed technology.

In the example shown in FIG. 6, although the first object 90A, which is positioned on a near point side of the depth of field, is set as the first object, and the second object 90B, which is positioned on a far point side of the depth of field, is set as the second object as an example, the second object 90B, which is positioned on the far point side of the depth of field, may be set as the first object, and the first object 90A, which is positioned on the near point side of the depth of field, may be set as the second object.

The distance data acquisition unit 102 acquires first distance data 82A related to the first object 90A and the second distance data 82B related to the second object 90B from the distance data 82 included in the moving image data 80.

Specifically, the distance data acquisition unit 102 acquires the first distance data 82A that is related to the first object 90A by deriving a phase difference (that is, a deviation amount and a deviation direction) between an image of the first object 90A obtained by a signal output from the photodiode PD1 and an image of the first object 90A obtained by a signal output from the photodiode PD2, based on the phase difference pixel data 73B (see FIG. 3) included in the distance data 82. The first distance data 82A is data related to a distance (hereinafter, referred to as a first object distance) between the first object 90A and the imaging apparatus 10. Hereinafter, a position separated from the light-receiving surface 72A by the first object distance is referred to as a first object position. The first object position represents a position of the first object 90A in the depth direction.

Similarly, the distance data acquisition unit 102 acquires second distance data 82B that is related to the second object 90B by deriving a phase difference (that is, a deviation amount and a deviation direction) between an image of the second object 90B obtained by a signal output from the photodiode PD1, and an image of the second object 90B obtained by a signal output from the photodiode PD2, based on the phase difference pixel data 73B (see FIG. 3) included in the distance data 82. The second distance data 82B is data related to a distance (hereinafter, referred to as a second object distance) between the second object 90B and the imaging apparatus 10. Hereinafter, a position separated from the light-receiving surface 72A by the second object distance is referred to as a second object position. The second object position represents a position of the second object 90B in the depth direction.

The AF continuation determination unit 103 determines whether or not to continue to perform AF with respect to the first object 90A and the second object 90B. Here, the AF with respect to the first object 90A and the second object 90B means focusing on a position (for example, a central position between the first object 90A and the second object 90B) between the first object 90A and the second object 90B according to a signal obtained from the image sensor 20.

For example, in a case where a state in which the first object position is within the depth of field and the second object position is out of the depth of field continues for first default time or longer, the AF continuation determination unit 103 determines not to continue to perform the AF with respect to the first object 90A and the second object 90B. The first default time is, for example, 3 seconds. The first default time may be a fixed value or may be a variable value that is changed in accordance with instructions and/or various types of conditions (for example, the imaging conditions) given by the user. Further, for example, in a case where the depth of field is narrower than a default range, the AF continuation determination unit 103 determines not to continue to perform the AF with respect to the first object 90A and the second object 90B. The default range may be a range set in advance or a range that is changed according to various types of conditions. Further, for example, in a case where the first object position is within the depth of field and the second object position is out of the imaging range, the AF continuation determination unit 103 determines not to continue to perform the AF with respect to the first object 90A and the second object 90B.

An inter-object distance is a distance between the first object position and the second object position in the depth direction. For example, in a case where a state in which the first object position is within the depth of field and the second object position is out of the depth of field and a state in which the inter-object distance is shorter than the length of the depth of field continue for second default time or longer, the AF continuation determination unit 103 determines to continue to perform the AF with respect to the first object 90A and the second object 90B. The length of the depth of field corresponds to the length of the depth of field in the depth direction. Hereinafter, the length of the depth of field in the depth direction is referred to as the length of the depth of field. The second default time is, for example, 3 seconds. The second default time may be a fixed value or may be a variable value that is changed in accordance with instructions and/or various types of conditions (for example, the imaging conditions) given by the user. Further, for example, in a case where time during which the first object position and the second object position are within the depth of field is equal to or longer than third default time, the AF continuation determination unit 103 determines to continue to perform the AF with respect to the first object 90A and the second object 90B. The third default time is, for example, 3 seconds. The third default time may be a fixed value or may be a variable value that is changed in accordance with instructions and/or various types of conditions (for example, the imaging conditions) given by the user.

The AF continuation determination unit 103 may perform the determination based on a condition other than the above. The first default time is an example of "first default time" according to the present disclosed technology, and the second default time is an example of "second default time" according to the present disclosed technology.

The AF continuation determination unit 103 determines whether or not the first object position is within the depth of field and whether or not the second object position is within the depth of field based on the first object distance obtained from the first distance data 82A, the second object distance obtained from the second distance data 82B, the near point distance calculated by using Equation (5), and the far point distance calculated by using Equation (6).

Further, the AF continuation determination unit 103 determines the length between the depth of field and the default range based on the depth of field calculated by using Equation (2). Further, the AF continuation determination unit 103 determines whether the inter-object distance is shorter or longer than the length of the depth of field based on the inter-object distance obtained from the first distance data 82A and the second distance data 82B, and the depth of field calculated by using Equation (2).

Further, the AF continuation determination unit 103 acquires image data 81 obtained by being imaged through the image sensor 20 and feature image data stored in the NVM 64 and/or the RAM 66 (see FIG. 2) in advance as representing a feature of the second object 90B. The AF continuation determination unit 103 determines whether or not the second object position is out of the imaging range by using a so-called template matching method. That is, the AF continuation determination unit 103 determines whether or not the second object position is out of the imaging range based on whether or not the feature image data is included in the image data 81. Here, although it is determined whether or not the second object position is out of the imaging range by using the template matching method, the present disclosed technology is not limited to this, and it may be determined whether or not the second object position is out of the imaging range by using a subject recognition method using AI.

The inter-object distance determination unit 104 determines whether or not the inter-object distance is shorter than the length of the depth of field. More specifically, the inter-object distance determination unit 104 specifies whether the inter-object distance is shorter or longer than the length of the depth of field based on the inter-object distance obtained from the first distance data 82A and the second distance data 82B and the depth of field calculated by using Equation (2), and determines whether or not the inter-object distance is shorter than the length of the depth of field based on the specification result.

Figure 7:
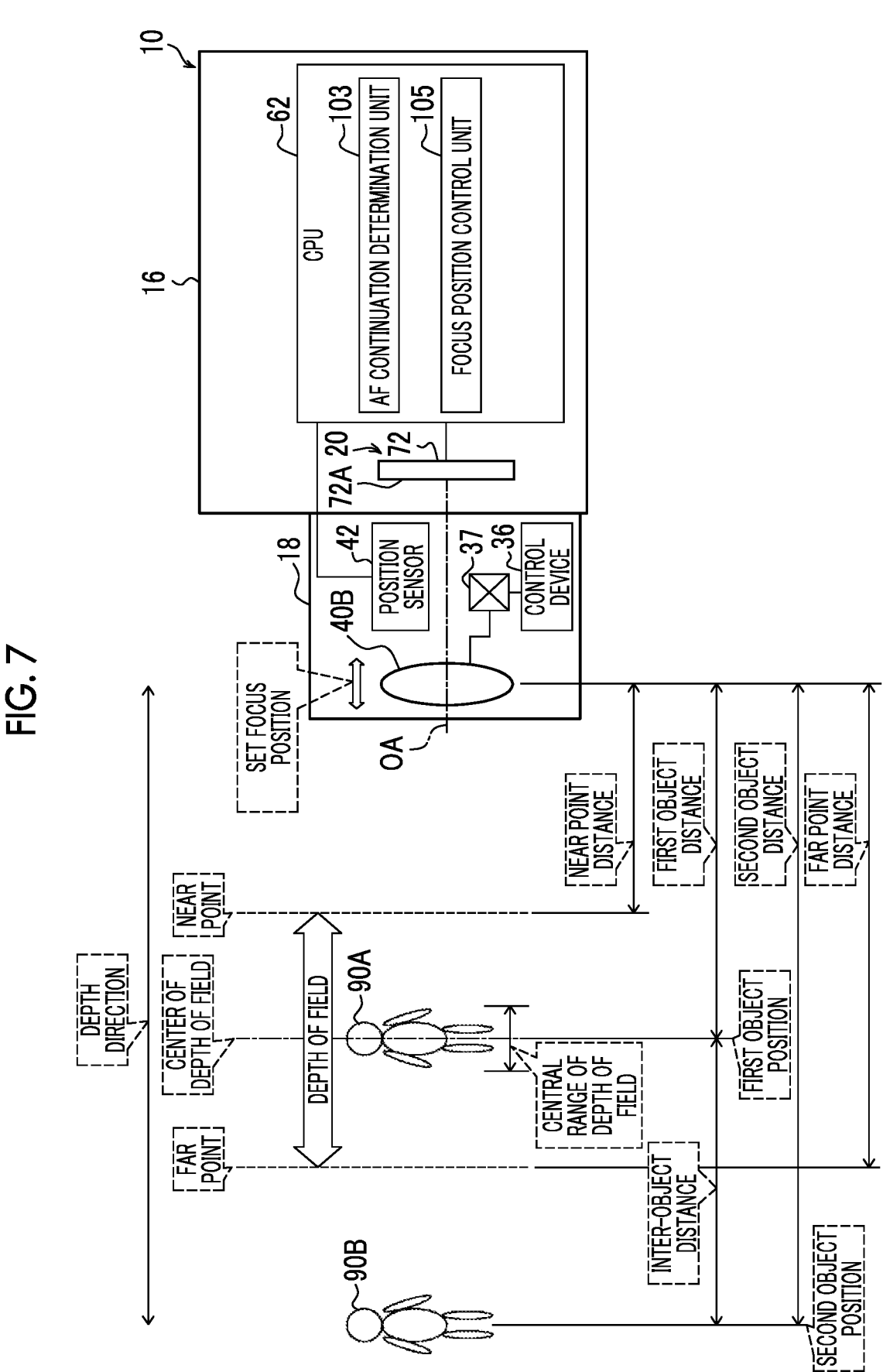
FIG. 7 is an explanatory diagram showing an example of a second operation example of the imaging apparatus according to the first embodiment.

As an example shown in FIG. 7, in a case where the determination is set as negative by the AF continuation determination unit 103, the focus position control unit 105 performs control of setting a focus position to a position where the first object position is within a central range of the depth of field. The performance of the control of setting the focus position means that the CPU 62 moves the position of the focus lens 40B to a designated position by driving a first actuator 37 via the control device 36 to move the focus lens 40B.

In the example shown in FIG. 7, although the second object position is out of the far point side of the depth of field, even in a case where the second object position is out of the near point side of the depth of field and the determination is set as negative by the AF continuation determination unit 103, the focus position control unit 105 performs the control of setting the focus position to a position where the first object position is within the central range of the depth of field.

The focus position control unit 105 performs the control of setting the focus position to a position where the first object position is within the central range of the depth of field based on the first object distance obtained from the first distance data 82A, the near point distance calculated by using Equation (5), the far point distance calculated by using Equation (6), and a set value related to the central range of the depth of field.

The central range of the depth of field is a range extending from the center of the depth of field to the front side and the rear side of the depth of field, and is defined as a ratio with respect to the depth of field. As an example, the central range of the depth of field is set to a range of 20% of the depth of field. The central range of the depth of field is not limited to 20% and can be set to any value. The central range of the depth of field may be increased or decreased depending on a factor such as a type of the first object 90A. Further, the central range of the depth of field may be increased or decreased to the front side of the depth of field, or may be increased or decreased to the rear side of the depth of field. The central range of the depth of field is an example of a "second central range of the depth of field" and a "third central range of the depth of field" according to the present disclosed technology.

In a case where the determination is set as negative by the AF continuation determination unit 103, the focus position control unit 105 may perform control of setting the focus position to a position where the center of the depth of field is set to the first object position.

Further, in a case where the determination is set as negative by the AF continuation determination unit 103 because the state in which the second object position is out of the depth of field continues for the first default time or longer, in a case where the determination is set as negative by the AF continuation determination unit 103 because the depth of field is narrower than the default range, and in a case where the determination is set as negative by the AF continuation determination unit 103 because the second object position is out of the imaging range, the focus position control unit 105 may change the length and/or a position of the central range of depth of field.

Further, the focus position control unit 105 controls the focus position according to whether or not the first object position in the depth direction based on the first distance data 82A and the second object position in the depth direction based on the second distance data 82B are within the depth of field.

As an example shown in FIG. 6, in a case where the determination is set as positive by the inter-object distance determination unit 104 because the inter-object distance is shorter than the length of the depth of field, the focus position control unit 105 performs the control of setting the focus position to a position where the first object position and the second object position are within the depth of field.

The focus position control unit 105 performs the control of setting the focus position to a position where the first object position and the second object position are within the depth of field based on the first object distance obtained from the first distance data 82A, the second object distance obtained from the second distance data 82B, the near point distance calculated by using Equation (5), and the far point distance calculated by using Equation (6).

Figure 8:
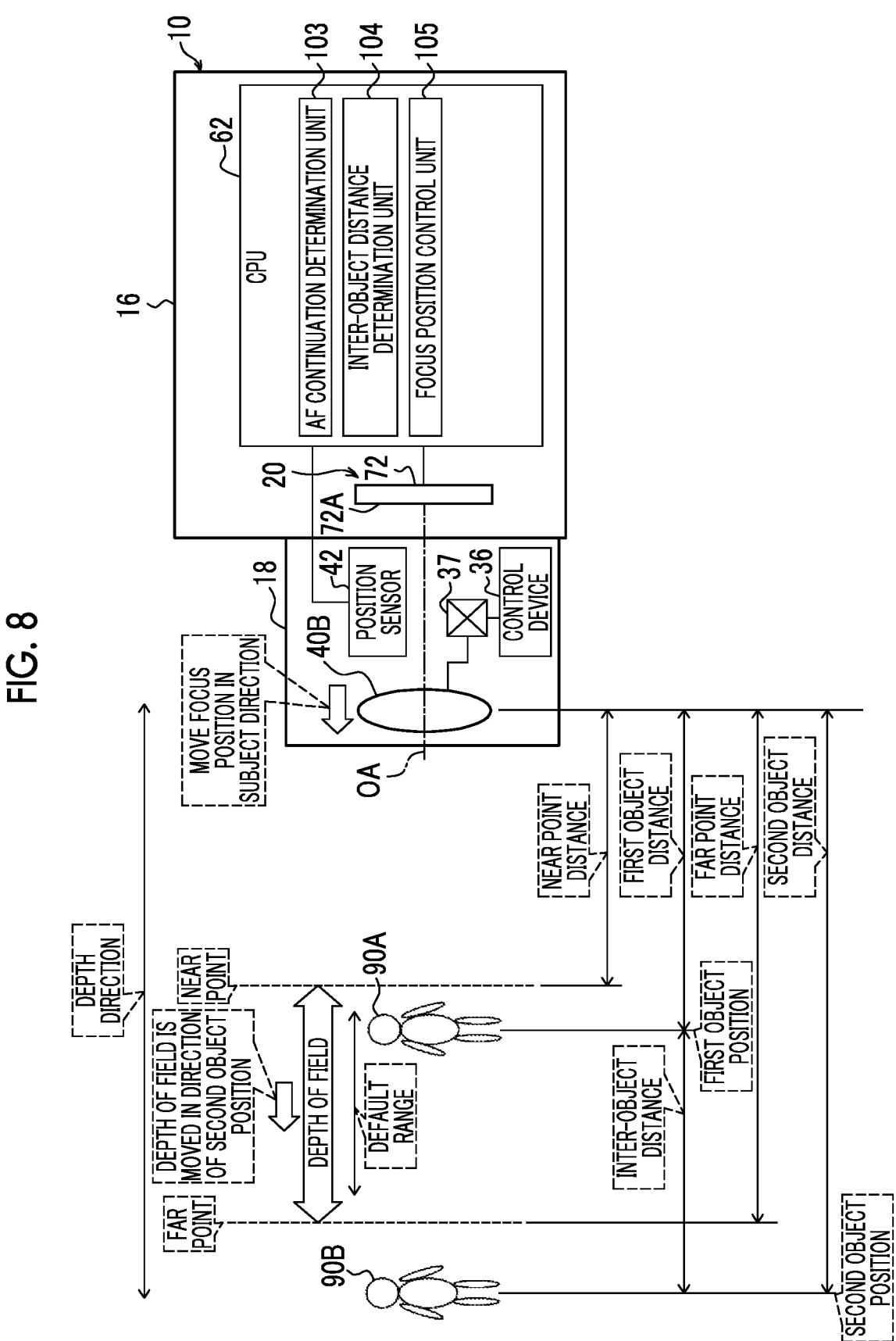
FIG. 8 is an explanatory diagram showing an example of a third operation example of the imaging apparatus according to the first embodiment.
Figure 9:
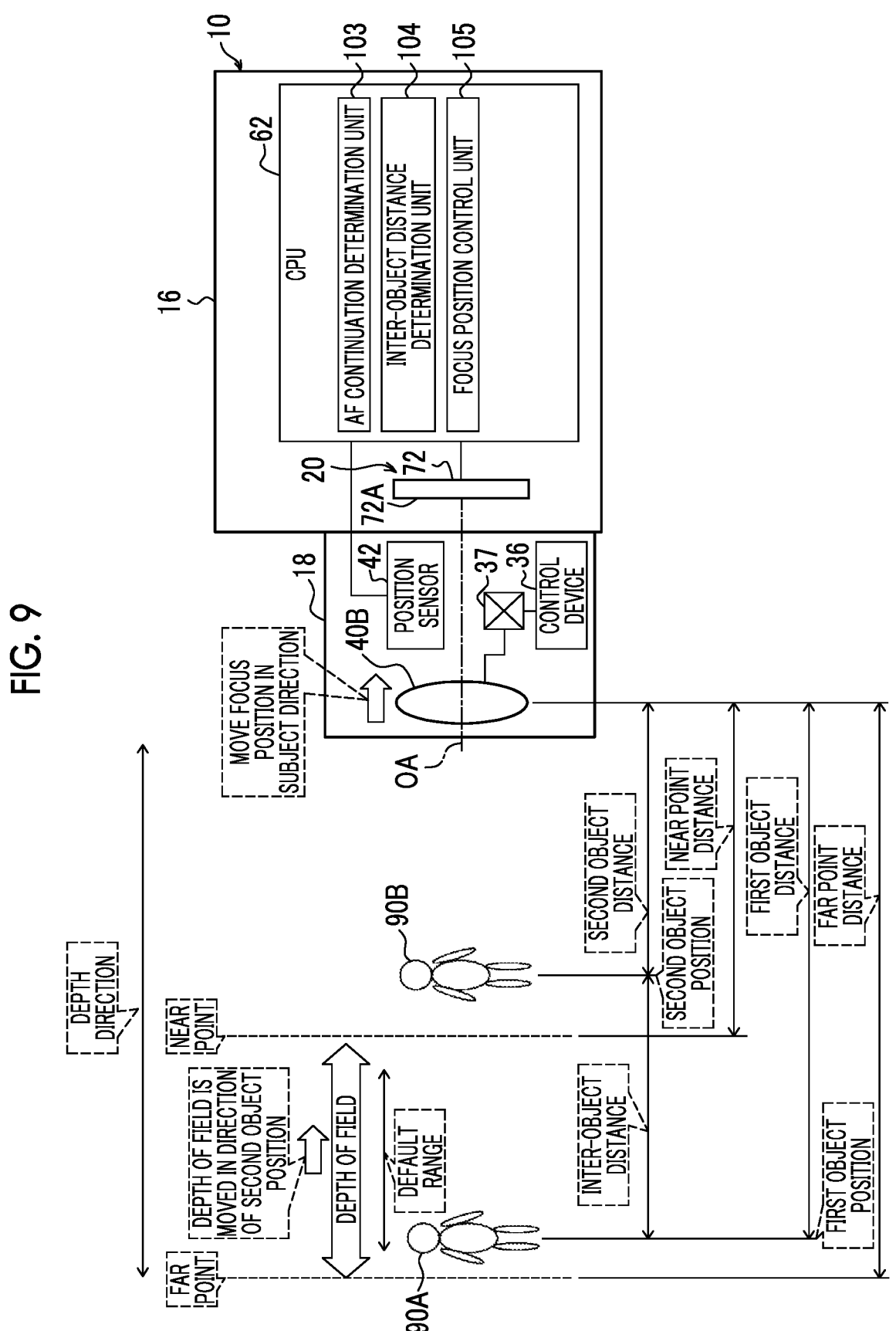
FIG. 9 is an explanatory diagram showing an example of a fourth operation example of the imaging apparatus according to the first embodiment.

Further, as an example shown in FIGS. 8 and 9, in a case where the determination is set as negative by the inter-object distance determination unit 104, for example, because the second object position is out of the depth of field and the inter-object distance is equal to or longer than the length of the depth of field, the focus position control unit 105 performs the control of moving the focus position in the same direction as a direction in which the second object position is out of the depth of field, within the range in which the first object position is within the depth of field. The performance of the control of moving the focus position means that the CPU 62 moves the position of the focus lens 40B by driving a first actuator 37 via the control device 36 to move the focus lens 40B.

Specifically, as an example shown in FIG. 8, in a case where the second object position is out of the far point side of the depth of field, the focus position control unit 105 performs the control of moving the focus position in the subject direction within the range in which the first object position is within the depth of field. In a case where the control for moving the focus position in the subject direction is performed, the depth of field is moved in a direction of the second object position which is the same direction as a movement direction of the focus position.

Further, as an example shown in FIG. 9, in a case where the second object position is out of the near point side of the depth of field, the focus position control unit 105 performs the control of moving the focus position in an image direction within the range in which the first object position is within the depth of field. In a case where the control for moving the focus position in the image direction is performed, the depth of field is moved in a direction of the second object position which is the same direction as a movement direction of the focus position.

The focus position control unit 105 performs the control of moving the focus position in the same direction as a direction in which the second object position is out of the depth of field within the range in which the first object position is within the depth of field based on the first object distance obtained from the first distance data 82A, the second object distance obtained from the second distance data 82B, the near point distance calculated by using Equation (5), and the far point distance calculated by using Equation (6).

The focus position control unit 105 may perform the control of moving the focus position in the same direction as the direction in which the second object position is out of the depth of field within the range in which the first object position is within the default range that is narrower than the depth of field. The default range is a range extending from the center of the depth of field to the front side and the rear side of the depth of field, and is defined as a ratio with respect to the depth of field. As an example, the default range is set to a range of 80% of the depth of field. The default range is not limited to 80% and can be set to any value. The default range may be increased or decreased depending on factors such as a type of the first object 90A, a movement direction of the first object 90A, or a movement speed of the first object 90A. Further, the default range may be increased or decreased to the front side of the depth of field, or may be increased or decreased to the rear side of the depth of field.

In this case, the focus position control unit 105 performs the control of moving the focus position in the same direction as a direction in which the second object position is out of the depth of field within the range in which the first object position is within the default range based on the first object distance obtained from the first distance data 82A, the second object distance obtained from the second distance data 82B, the near point distance calculated by using Equation (5), the far point distance calculated by using Equation (6), and the set value related to the default range of the depth of field.

In the examples shown in FIGS. 8 and 9, the direction in which the second object position is out of the depth of field and the direction in which the focus position is moved are examples of a "first direction" according to the present disclosed technology.

Next, an action of the imaging apparatus 10 according to the first embodiment will be described with reference to FIG. 10. FIG. 10 shows an example of a flow of the focus position control processing according to the first embodiment. The focus position control processing shown in FIG. 10 is executed, for example, during the display of the live view image before an imaging instruction is provided through the release button 22 in the AF mode.

In the focus position control processing shown in FIG. 10, first, in step S11, the object setting unit 101 sets the first object 90A to be focused in a plurality of objects included in the moving image indicated by the image data 81 based on the image data 81 included in the moving image data 80.

In step S12, the object setting unit 101 sets the second object 90B to be focused on a plurality of objects included in the moving image indicated by the image data 81.

In step S13, the distance data acquisition unit 102 acquires the first distance data 82A related to the first object 90A from the distance data 82 included in the moving image data 80.

In step S14, the distance data acquisition unit 102 acquires the second distance data 82B related to the second object 90B from the distance data 82 included in the moving image data 80.

In step S15, the AF continuation determination unit 103 determines whether or not to continue to perform the AF with respect to the first object 90A and the second object 90B. In step S15, in a case where the AF continuation determination unit 103 does not continue to perform the AF with respect to the first object 90A and the second object 90B, the determination is set as negative, and the processing shown in FIG. 10 shifts to step S16. In step S15, in a case where the AF continuation determination unit 103 continues to perform the AF with respect to the first object 90A and the second object 90B, the determination is set as positive, and the processing shown in FIG. 10 shifts to step S17.

In step S16, the focus position control unit 105 performs the control of setting the focus position to the position where the first object position is within the central range of the depth of field. In this case, the focus position control unit 105 may perform the control of setting the focus position to the position where the center of the depth of field is set to the first object position.

In step S17, the inter-object distance determination unit 104 determines whether or not the inter-object distance is shorter than the length of the depth of field. In step S17, in a case where the inter-object distance is shorter than the length of the depth of field, the determination is set as positive, and the processing shown in FIG. 10 shifts to step S18. In step S17, in a case where the inter-object distance is not shorter than the length of the depth of field, the determination is set as negative, and the processing shown in FIG. 10 shifts to step S19.

In step S18, the focus position control unit 105 performs the control of setting the focus position to the position where the first object position and the second object position are within the depth of field.

In step S19, the focus position control unit 105 performs the control of moving the focus position in the same direction as the direction in which the second object position is out of the depth of field within the range in which the first object position is within the depth of field.

After the processing of step S16 is executed, the processing shown in FIG. 10 is ended. The imaging method described as the action of the imaging apparatus 10 described above is an example of an "imaging method" according to the present disclosed technology.

As described above, in the imaging apparatus 10 according to the first embodiment, the CPU 62 acquires the first distance data 82A related to a distance between the imaging apparatus 10 and the first object 90A that is included in the moving image and the second distance data 82B related to a distance between the imaging apparatus 10 and the second object 90B that is included in the moving image, which are indicated by the moving image data 80 obtained by being imaging with the image sensor 20. Thereafter, the CPU 62 controls the focus position according to whether or not the first object position in the depth direction based on the first distance data 82A and the second object position in the depth direction based on the second distance data 82B are within the depth of field. Therefore, for example, in a case where the first object 90A and the second object 90B are imaged, a sudden change in a focus state can be suppressed even in a case where the second object 90B is moved in the depth direction.

Further, in a case where the second object position is out of the depth of field, the CPU 62 performs the control of moving the focus position in the same direction as the direction in which the second object position is out of the depth of field within the range in which the first object position is within the depth of field. Therefore, for example, in a case where the first object 90A and the second object 90B are imaged, a sudden change in a focus state can be suppressed even in a case where the second object 90B is moved in the depth direction.

Further, in a case where a state in which the second object position is out of the depth of field continues for first default time or longer, the CPU 62 performs control of setting the focus position to the position where the first object position is within the central range of the depth of field. Therefore, it is possible to focus on the first object 90A.

Further, even in a case where the depth of field is narrower than the default range, the CPU 62 performs the control of setting the focus position to the position where the first object position is within the central range of the depth of field. Therefore, it is possible to focus on the first object 90A.

Further, in a case where the state in which the second object position is out of the depth of field and a state in which the inter-object distance is shorter than the length of the depth of field continue for second default time or longer, the CPU 62 performs the control of setting the focus position to the position where the first object position and the second object position are within the depth of field. Therefore, it is possible to focus on the first object 90A and the second object 90B.

Further, the CPU 62 acquires the first distance data 82A and the second distance data 82B based on the imaging data 73 output from the image sensor 20. Therefore, a distance sensor other than the image sensor 20 can be eliminated.

Further, the image sensor 20 includes a plurality of photosensitive pixels 72B, and the CPU 62 acquires the first distance data 82A and second distance data 82B from among the imaging data 73 based on the phase difference pixel data 73B output from the photosensitive pixels 72B. Therefore, the first distance data 82A and the second distance data 82B can be acquired from the imaging data 73.

Further, the photosensitive pixel 72B is a pixel for selectively outputting the non-phase difference pixel data 73A and the phase difference pixel data 73B. Further, the non-phase difference pixel data 73A is pixel data obtained by performing the photoelectric conversion in the entire region of the photosensitive pixels 72B, and the phase difference pixel data 73B is pixel data obtained by performing the photoelectric conversion in a partial region of the photosensitive pixels 72B. Therefore, the image data 81 and the distance data 82 can be acquired from the imaging data 73.

In the first embodiment, in a case where the determination is set as negative by the inter-object distance determination unit 104, for example, because the second object position is out of the depth of field and the inter-object distance is equal to or longer than the length of the depth of field, the focus position control unit 105 performs the control of moving the focus position in the same direction as a direction in which the second object position is out of the depth of field, within the range in which the first object position is within the depth of field. However, for example, even in a case where the inter-object distance is shorter than the length of the depth of field, in a case where the second object position is out of the depth of field, the focus position control unit 105 may perform the control of moving the focus position in the same direction as the direction in which the second object position is out of the depth of field, within the range in which the first object position is within the depth of field. Further, in this case, the second object position may or may not be within the depth of field.

Further, in the first embodiment, although the distance is acquired for a position corresponding to each of the photosensitive pixels 72B included in the photoelectric conversion element 72, the CPU 62 does not necessarily need to obtain the distance from the positions corresponding to all the photosensitive pixels 72B. That is, the photosensitive pixels 72B for acquiring the distance may be thinned out.

Further, in the first embodiment, although the photoelectric conversion element 72 is an image plane phase difference type photoelectric conversion element in which a pair of photodiodes PD1 and PD2 is provided in one pixel and all the photosensitive pixels 72B have a function of outputting data related to imaging and phase difference, all the photosensitive pixels 72B are not limited to having the function of outputting data related to imaging and a phase difference. The photoelectric conversion element 72 may include a photosensitive pixel 72B that does not have a function of outputting data related to the imaging and a phase difference. Further, the photoelectric conversion element 72 is not limited to an image plane phase difference type photoelectric conversion element in which the pair of photodiodes PD1 and PD2 is provided in one pixel, the photoelectric conversion element 72 may include imaging photosensitive pixels 72B for acquiring the non-phase difference pixel data 73A and phase difference detection photosensitive pixels 72B for acquiring the phase difference pixel data 73B. In this case, the phase difference pixel is provided with a light shielding member to light-receive on one of the first pupil portion region and the second pupil portion region.

Further, in the first embodiment, although the distance data 82 is acquired by the phase difference type photoelectric conversion element 72, it is not limited to the phase difference type, and the distance data 82 may be acquired by using a TOF type photoelectric conversion element, or the distance data 82 may be acquired by using a stereo camera or a depth sensor. The distance data 82 may be acquired in accordance with the frame rate of the image sensor 20 or may be acquired at a time interval longer or shorter than a time interval defined by the frame rate of the image sensor 20.

Second Embodiment

As an example shown in FIGS. 11 and 12, in a second embodiment, the configuration of the imaging apparatus 10 is changed as follows with respect to the first embodiment. That is, the CPU 62 operates as an object movement determination unit 106 in addition to the object setting unit 101, the distance data acquisition unit 102, the AF continuation determination unit 103, the inter-object distance determination unit 104, and the focus position control unit 105.

Figure 11:
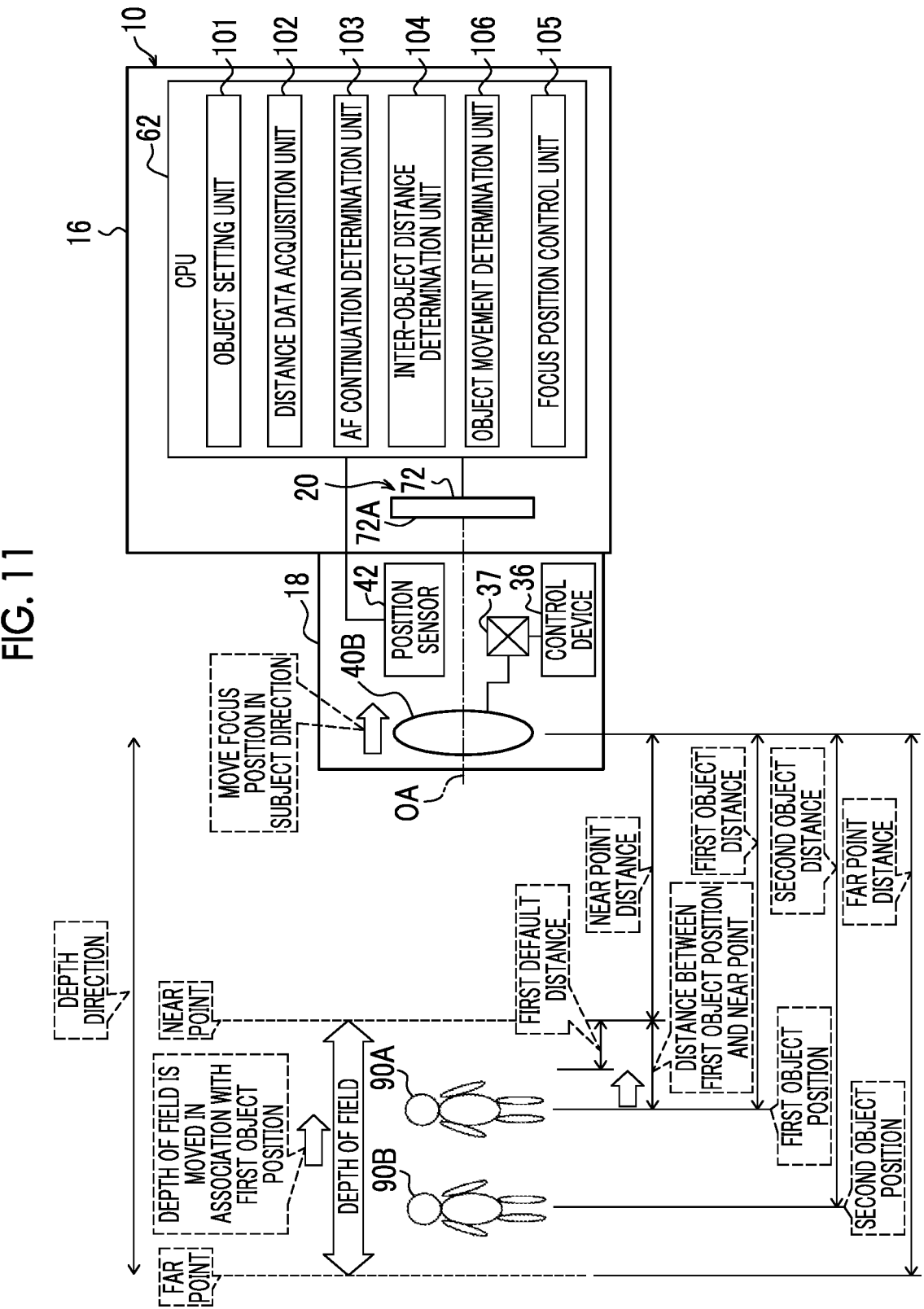
FIG. 11 is an explanatory diagram showing an example of a first operation example of the imaging apparatus according to a second embodiment.

As an example shown in FIG. 11, in a case where the control of setting the focus position to the position where the first object position and the second object position are within the depth of field is performed by the focus position control unit 105, the object movement determination unit 106 determines whether or not a distance between the first object position and the near point of the depth of field is equal to or shorter than a first default distance.

More specifically, the object movement determination unit 106 specifies whether the distance between the first object position and the near point of the depth of field is shorter or longer than the first default distance based on the first object distance obtained from the first distance data 82A, the near point distance calculated by using Equation (5), and the first default distance, and determines whether or not the distance between the first object position and the near point of the depth of field is equal to or shorter than the first default distance based on the specification result.

Figure 12:
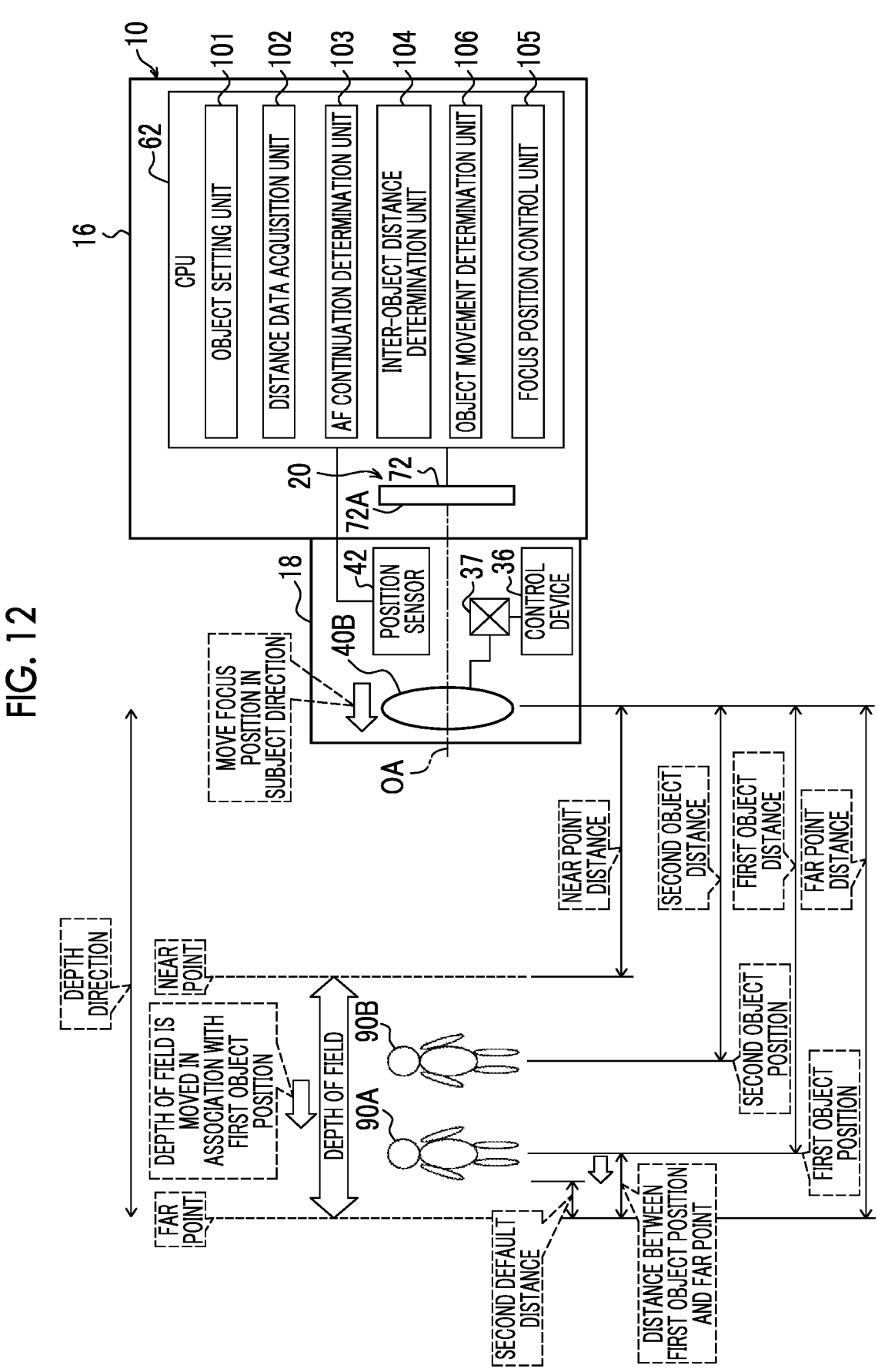
FIG. 12 is an explanatory diagram showing an example of a second operation example of the imaging apparatus according to the second embodiment.

Further, as an example shown in FIG. 12, in a case where the control of setting the focus position to the position where the first object position and the second object position are within the depth of field is performed by the focus position control unit 105, the object movement determination unit 106 determines whether or not a distance between the first object position and the far point of the depth of field is equal to or shorter than a second default distance.

More specifically, the object movement determination unit 106 specifies whether the distance between the first object position and the far point of the depth of field is shorter or longer than the second default distance based on the first object distance obtained from the first distance data 82A, the far point distance calculated by using Equation (6), and the second default distance, and determines whether or not the distance between the first object position and the far point of the depth of field is equal to or shorter than the second default distance based on the specification result.

In the following, unless it is not necessary to perform distinction, the near point of the depth of field and the far point of the depth of field are referred to as default ends of the depth of field, and the first default distance and the second default distance are referred to as default distances. The default end of the depth of field is an example of a "default end of a depth of field" according to the present disclosed technology, and the default distance is an example of a "default distance" according to the present disclosed technology.

As an example shown in FIGS. 11 and 12, in a case where the determination is set as positive by the object movement determination unit 106 because the distance between the first object position and the default end of the depth of field is equal to or shorter than the default distance, the focus position control unit 105 performs the control of moving the focus position in accordance to the movement of the first object position.

Specifically, as an example shown in FIG. 11, in a case where the determination is set as positive by the object movement determination unit 106 because the distance between the first object position and the near point of the depth of field is equal to or shorter than the first default distance, the focus position control unit 105 performs the control of moving the focus position to the image direction in accordance to the movement of the first object position on the near point side.

Further, as an example shown in FIG. 12, in a case where the determination is set as positive by the object movement determination unit 106 because the distance between the first object position and the far point of the depth of field is equal to or shorter than the second default distance, the focus position control unit 105 performs the control of moving the focus position to the subject direction in accordance to the movement of the first object position on the far point side. In this case, the focus position control unit 105 may perform control of associating the focus position with the first object position that is moved in the depth direction.

The performance of the control of associating the focus position with the first object position, which moves in the depth direction, means that the CPU 62 moves the position of the focus lens 40B to a direction in which the first object 90A is moved by driving a first actuator 37 via the control device 36 to move the focus lens 40B. In a case where the control of associating the focus position with the first object position that is moved in the depth direction, is performed, the depth of field is moved in association with the first object position.

In a case where the first object position is moved to the near point side, the focus position control unit 105 performs the control of associating the focus position with the first object position, which is moved to the near point side while maintaining a state in which the first object distance is longer than the near point distance based on the first object distance obtained from the first distance data 82A and the near point distance calculated by using Equation (5).

Further, in a case where the first object position is moved to the far point side, the focus position control unit 105 performs the control of associating the focus position with the first object position, which is moved to the far point side while maintaining a state in which the first object distance is shorter than the far point distance based on the first object distance obtained from the first distance data 82A and the far point distance calculated by using Equation (6).

In a case where the control of moving the focus position is performed according to the movement of the first object position, the focus position control unit 105 may perform the control of setting the focus position to the position where the depth of field is moved the default distance in the direction in which the first object position is moved.

Further, in a case where the control of associating the focus position with the first object position, which is moved in the depth direction, is performed, the focus position control unit 105 may move the depth of field according to the movement speed of the first object position or may move the depth of field at a speed different from the movement speed of the first object position.

Next, an action of the imaging apparatus 10 according to the second embodiment will be described with reference to FIG. 13. FIG. 13 shows an example of a flow of the focus position control processing according to the second embodiment. In the focus position control processing shown in FIG. 13, steps S11 to S19 have the same processing as the focus position control processing according to the first embodiment.

After step S18, the processing shown in FIG. 13 shifts to step S20.

In step S20, the object movement determination unit 106 determines whether or not the distance between the first object position and the default end of the depth of field is equal to or shorter than the default distance. In step S20, in a case where the distance between the first object position and the default end of the depth of field is longer than the default distance, the determination is set as negative, and the processing shown in FIG. 13 shifts to step S15. In step S20, in a case where the distance between the first object position and the default end of the depth of field is equal to or shorter than the default distance, the determination is set as positive, and the processing shown in FIG. 13 shifts to step S21.

In step S21, the focus position control unit 105 performs the control of moving the focus position according to the movement of the first object position. In this case, for example, the focus position control unit 105 may perform control of associating the focus position with the first object position that is moved in the depth direction. After the processing of step S21 is executed, the processing shown in FIG. 13 shifts to step S15.

As described above, in the imaging apparatus 10 according to the second embodiment, in a case where the first object position and the second object position are within the depth of field, the CPU 62 performs the control of moving the focus position according to movement of the first object position in the depth direction. Therefore, it is possible to move the depth of field according to the movement of the first object position.

Further, in a case where the first object position and the second object position are within the depth of field, the CPU 62 may perform the control of associating the focus position with the first object position that is moved in the depth direction. In this case, the depth of field can be associated with the first object position.

Further, in a case where the first object position and the second object position are within the depth of field, the CPU 62 performs the control of associating the focus position with the first object position on a condition in which the distance between the first object position and the default end of the depth of field is equal to or shorter than the default distance. Therefore, it is possible to start the control of associating the focus position before the first object position is out of the default end of the depth of field.

Third Embodiment

As an example shown in FIG. 14, in a third embodiment, the configuration of the imaging apparatus 10 is changed as follows with respect to the first embodiment.

That is, in the third embodiment, in a case where the determination is set as positive by the inter-object distance determination unit 104 because the inter-object distance is shorter than the length of the depth of field, the focus position control unit 105 performs the control of setting the focus position to a position where the position between the first object position and the second object position (hereinafter, referred to as an inter-object position) is within the central range of the depth of field.

The inter-object position may be a position out of the center between the first object position and the second object position or may be a central position between the first object position and the second object position. In the example shown in FIG. 14, as an example, the inter-object position is set at the central position between the first object position and the second object position.

The focus position control unit 105 performs the control of setting the focus position to the position where the inter-object position is within the central range of the depth of field based on the first object distance obtained from the first distance data 82A, the second object distance obtained from the second distance data 82B, a set value related to the inter-object position, the near point distance calculated by using Equation (5), the far point distance calculated by using Equation (6), and the set value related to the central range of the depth of field.

The central range of the depth of field is a range extending from the center of the depth of field to the front side and the rear side of the depth of field, and is defined as a ratio with respect to the depth of field. As an example, the central range of the depth of field is set to a range of 20% of the depth of field. The central range of the depth of field is not limited to 20% and can be set to any value. The central range of the depth of field may be increased or decreased depending on a factor such as a type of the first object 90A. Further, the central range of the depth of field may be increased or decreased to the front side of the depth of field, or may be increased or decreased to the rear side of the depth of field. The central range of the depth of field is an example of a "first central range of a depth of field" according to the present disclosed technology.

In a case where the determination is set as positive by the inter-object distance determination unit 104, the focus position control unit 105 may perform the control of setting the focus position to the position where the center of the depth of field is set to the inter-object position.

Figure 14:
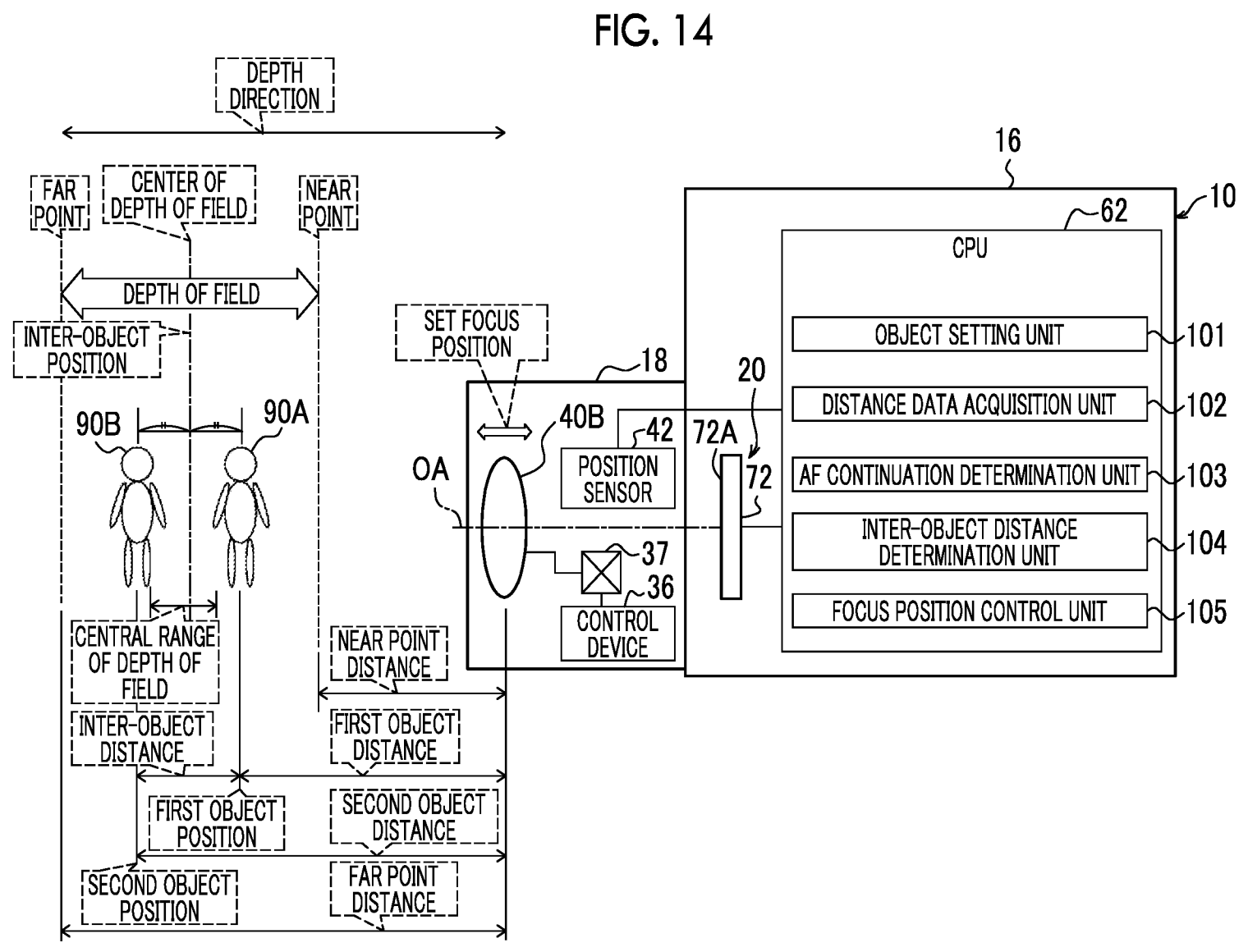

In the example shown in FIG. 14, although the first object position is positioned on the near point side and the second object position is positioned on the far point side of the depth of field, even in a case where the first object position is positioned on the far point side and the second object position is positioned on the near point side of the depth of field, the focus position control unit 105 performs the control of setting the focus position to the position where the first object position is within the central range of the depth of field.

As described above, in the imaging apparatus 10 according to the third embodiment, in a case where the first object position and the second object position are within the depth of field, the CPU 62 performs the control of setting the focus position to the position where the inter-object position is within the central range of the depth of field. Therefore, even in a case where the first object position and the second object position are moved, it is possible to continue to maintain the state in which the first object position and the second object position are within the depth of field.

Further, the inter-object position may be a central position between the first object position and the second object position. In this case, for example, the first object position and the second object position can be within the depth of field with good balance as compared with the case where the inter-object position deviates from the central position between the first object position and the second object position.

Fourth Embodiment

As an example shown in FIG. 15, in a fourth embodiment, the configuration of the imaging apparatus 10 is changed as follows with respect to the first embodiment.

That is, in the fourth embodiment, in a case where the determination is set as positive by the inter-object distance determination unit 104 because the inter-object distance is shorter than the depth of field, the focus position control unit 105 performs the control of setting the focus position to a position where the focusing position is set to the inter-object position.

The focus position control unit 105 performs the control of setting the focus position to the position where the focusing position is set to the inter-object position based on the first object distance obtained from the first distance data 82A, the second object distance obtained from the second distance data 82B, the set value related to the inter-object position, and the object distance calculated by using Equation (1).

Figure 15:
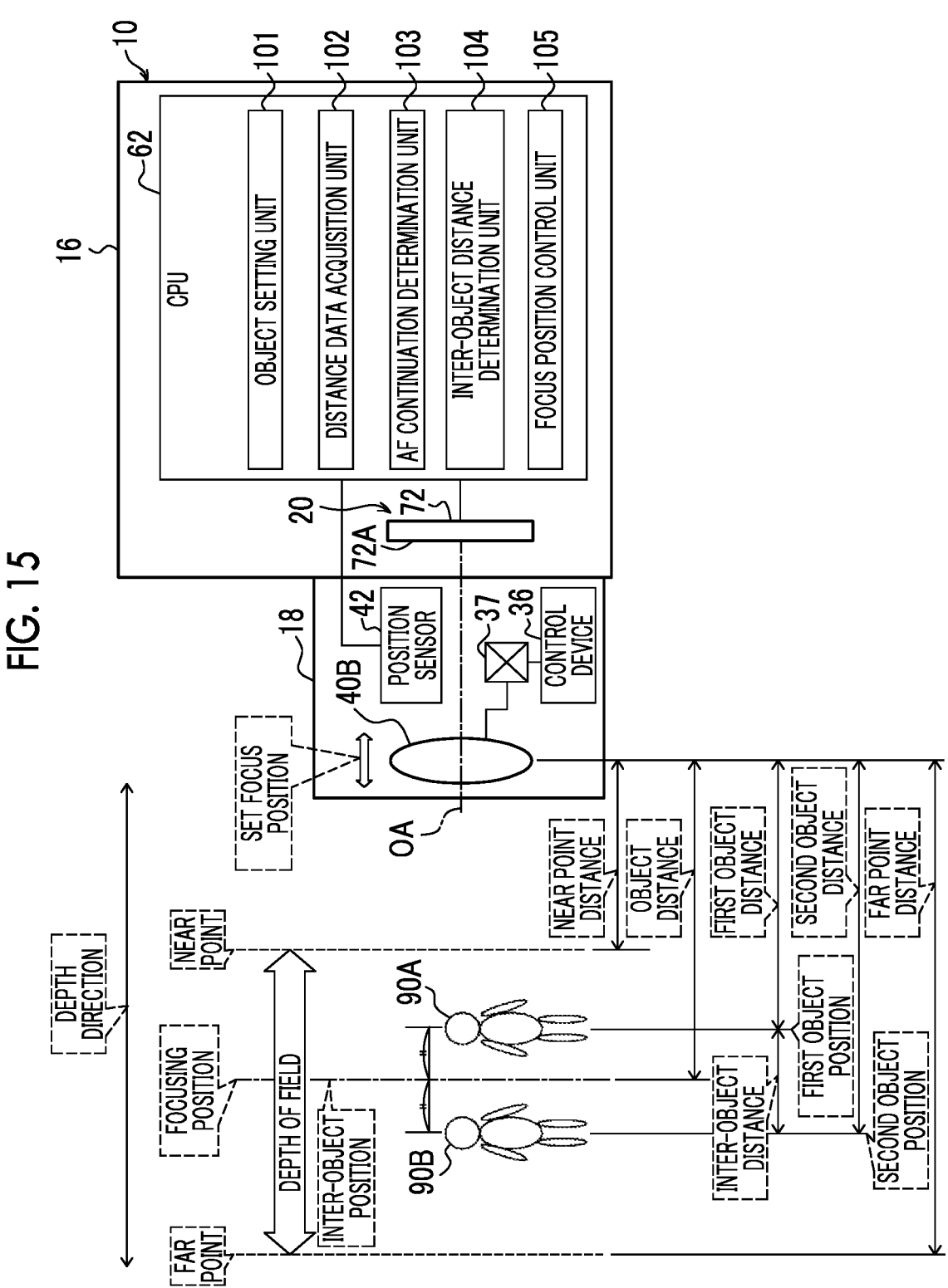
FIG. 15 is an explanatory diagram showing an example of an operation example of the imaging apparatus according to a fourth embodiment.

In the example shown in FIG. 15, although the first object position is positioned on the near point side and the second object position is positioned on the far point side of the depth of field, even in a case where the first object position is positioned on the far point side and the second object position is positioned on the near point side of the depth of field, the focus position control unit 105 performs the control of setting the focus position to the position where the focusing position is set to the inter-object position.

As described above, in the imaging apparatus 10 according to the fourth embodiment, in a case where the first object position and the second object position are within the depth of field, the CPU 62 performs the control of setting the focus position to the position where the focusing position is set to the inter-object position. Therefore, even in a case where the first object position and the second object position are moved, it is possible to continue to maintain the state in which the first object position and the second object position are within the depth of field.

Further, the inter-object position may be a central position between the first object position and the second object position. In this case, for example, the first object position and the second object position can be within the depth of field with good balance as compared with the case where the inter-object position deviates from the central position between the first object position and the second object position.

Further, in general, the focusing position is positioned on the near point side of the center of the depth of field. Therefore, by setting the focusing position to the inter-object position, for example, the second object 90B, which is positioned on the far point side of the first object 90A and the second object 90B, can be focused as compared with the case where the center of the depth of field is set to the inter-object position (see FIG. 14).

Fifth Embodiment

As an example shown in FIG. 16, in a fifth embodiment, the configuration of the imaging apparatus 10 is changed as follows with respect to the first embodiment.

That is, each of the plurality of objects 110A and 110B, which is detected by the object detection function of the imaging apparatus 10, is displayed on the display 28 in a state of being surrounded by frames 111A and 111B, respectively. In the example shown in FIG. 16, as an example, the object 110A is a person's face and is a movable object accompanied by movement. Further, as an example, the object 110B is a part of a building and is a fixed object that is fixed.

The object setting unit 101 according to the fifth embodiment sets, among the plurality of objects 110A and 110B, an object in which a default condition is satisfied, as the first object. Examples of the default condition include a condition in which an instruction is given from the outside and a condition in which detection is made as a default object by performing the detection processing.

As an example of the instruction given from the outside, in a case where an instruction to select object 110A or 110B from the user, which is received by the reception device 76, is received, the object setting unit 101 may set the first object from the plurality of objects 110A and 110B displayed on the display 28 according to the instruction from the user.

Further, as an example of the instruction given from the outside, in a case where the instruction is received by the user designating an image within the frame 111A or 111B using the touch panel 30, the object setting unit 101 may set the first object from a plurality of objects 110A and 110B displayed on the display 28 according to the instruction from the user.

Further, as an example of the instruction given from the outside, in a case where the instruction from an external apparatus, which is received by the external OF 50, is received, the object setting unit 101 may set the first object from the plurality of objects 110A and 110B according to the instruction from the external apparatus.

Further, as an example in which detection is made as the default object by performing the detection processing, for example, in a case where a movable object is detected by performing the object detection processing using artificial intelligence, the object setting unit 101 may set the movable object as the first object.

Figure 16:
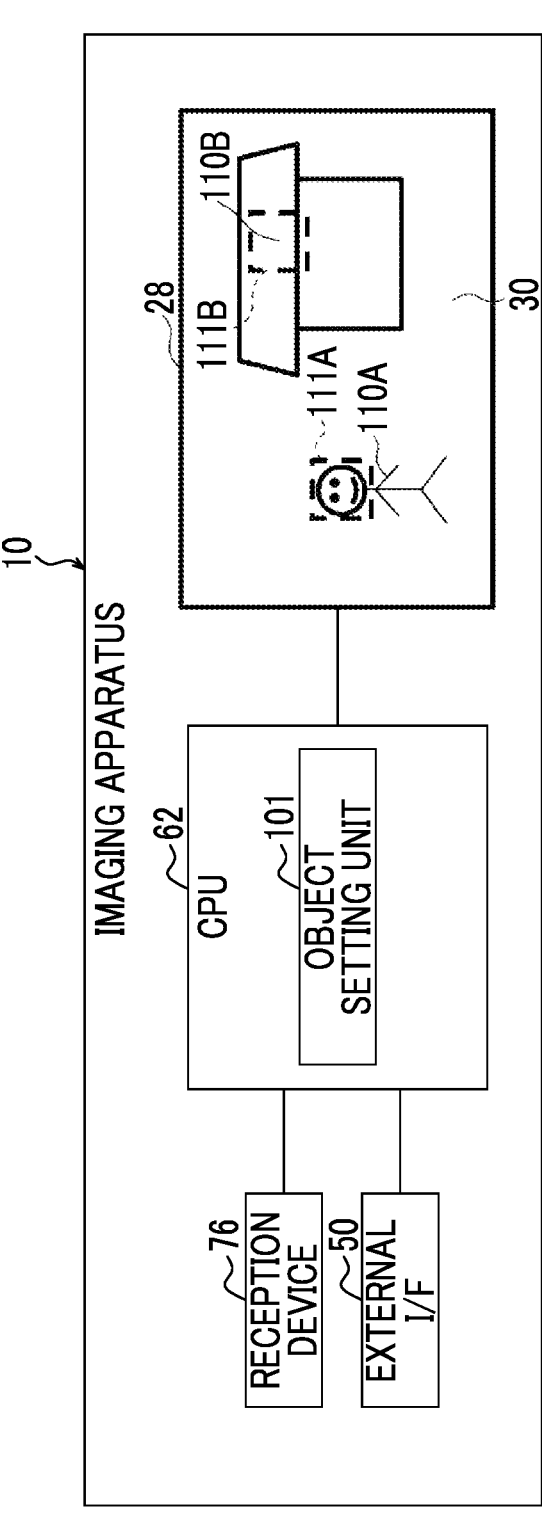
FIG. 16 is an explanatory diagram showing an example of an operation example of the imaging apparatus according to a fifth embodiment.

In the example shown in FIG. 16, the object setting unit 101 sets the object 110A as the first object, and the object setting unit 101 sets the object 110B as the second object.

As described above, in the imaging apparatus 10 according to the fifth embodiment, the CPU 62 sets an object, among the plurality of objects specified from the moving image data 80, in which the default condition is satisfied, as the first object. Therefore, for example, in a case where the first object is set regardless of whether or not the default condition is satisfied, it is possible to increase the probability in which the priority object of the user can be set as the first object.

Further, the default condition may be a condition in which the instruction is given from the outside. In this case, an object in which the instruction is given from the outside can be set as the first object.

Further, the default condition may be a condition in which the detection is made as the default object by performing the detection processing. In this case, for example, in a case where the first object is set without performing the detection processing, it is possible to increase the probability in which the priority object of the user can be set as the first object.

Sixth Embodiment

As an example shown in FIG. 17, in a sixth embodiment, the configuration of the imaging apparatus 10 is changed as follows with respect to the first embodiment.

That is, the CPU 62 operates as the object setting unit 101, the distance data acquisition unit 102, the AF continuation determination unit 103, the inter-object distance determination unit 104, the object position determination unit 107, and the focus position control unit 105.

The object setting unit 101 sets the first object, the second object, and a third object to be focused in a plurality of objects included in the moving image indicated by the image data 81 based on the image data 81 included in the moving image data 80. Examples of the first object, the second object, and the third object include a person, a person's face, a person's body, an animal, a car, and a fixed object. The first object, the second object, and the third object may be objects of different types from each other. Further, at least any one of the first object, the second object, or the third object may be an aggregate of a plurality of objects. Further, at least one of the first object, the second object, or the third object may be an aggregate in which a plurality of types of objects are mixed.

In the example shown in FIG. 17, a case where the first object 90A, the second object 90B, and the third object 90C are set by the object setting unit will be described as an example. The first object 90A is an example of a "first object" according to the present disclosed technology, the second object 90B is an example of a "second object" according to the present disclosed technology, and the third object 90C is an example of a "third object" according to the present disclosed technology.

The distance data acquisition unit 102 acquires the first distance data 82A related to the first object 90A, the second distance data 82B related to the second object 90B, and the third distance data 82C related to the third object 90C from the distance data 82 included in the moving image data 80.

Specifically, the distance data acquisition unit 102 acquires the first distance data 82A that is related to the first object 90A by deriving a phase difference (that is, a deviation amount and a deviation direction) between an image of the first object 90A obtained by a signal output from the photodiode PD1 and an image of the first object 90A obtained by a signal output from the photodiode PD2, based on the phase difference pixel data 73B (see FIG. 3) included in the distance data 82. A point in which the first distance data 82A is data related to the first object distance and a point in which the first object position represents a position of the first object 90A in the depth direction are the same as those of the first embodiment.

Similarly, the distance data acquisition unit 102 acquires second distance data 82B that is related to the second object 90B by deriving a phase difference (that is, a deviation amount and a deviation direction) between an image of the second object 90B obtained by a signal output from the photodiode PD1, and an image of the second object 90B obtained by a signal output from the photodiode PD2, based on the phase difference pixel data 73B (see FIG. 3) included in the distance data 82. A point in which the second distance data 82B is data related to the second object distance and a point in which the second object position represents a position of the second object 90B in the depth direction are the same as those of the first embodiment.

Further, the distance data acquisition unit 102 acquires third distance data 82C that is related to the third object 90C by deriving a phase difference (that is, a deviation amount and a deviation direction) between an image of the third object 90C obtained by a signal output from the photodiode PD1, and an image of the third object 90C obtained by a signal output from the photodiode PD2, based on the phase difference pixel data 73B (see FIG. 3) included in the distance data 82. The third distance data 82C is data related to a distance (hereinafter, referred to as a third object distance) between the third object 90C and the imaging apparatus Hereinafter, a position separated from the light-receiving surface 72A by the third object distance is referred to as a third object position. The third object position represents a position of the third object 90C in the depth direction.

The AF continuation determination unit 103 determines whether or not to continue to perform the AF with respect to the first object 90A, the second object 90B, and the third object Here, the AF with respect to the first object 90A, the second object 90B, and the third object 90C means that a central portion of a range in the depth direction, which is defined by the first object 90A, the second object 90B, and the third object 90C, is focused according to the signal obtained from the image sensor 20 (for example, the central position of the range in the depth direction defined by the first object 90A, the second object 90B, and the third object 90C).

For example, in a case where a state in which the first object position is within the depth of field, and the second object position and/or the third object position are out of the depth of field continues for the first default time or longer, the AF continuation determination unit 103 determines not to continue to perform the AF with respect to the first object 90A, the second object 90B, and the third object 90C. Further, for example, in a case where the depth of field is narrower than the default range, the AF continuation determination unit 103 determines not to continue to perform the AF with respect to the first object 90A, the second object 90B, and the third object 90C. The default range may be a range set in advance or a range that is changed according to various types of conditions. Further, for example, in a case where the first object position is within the depth of field, and the second object position and/or the third object position are out of the imaging range, the AF continuation determination unit 103 determines not to continue to perform the AF with respect to the first object 90A, the second object 90B, and the third object 90C.

A both ends inter-object distance is a distance between both ends position of the first object position, the second object position, and the third object position in the depth direction. For example, in a case where a state in which the first object position is within the depth of field, and the second object position and/or the third object position are out of the depth of field and a state in which the both ends inter-object distance is shorter than the length of the depth of field continue for the second default time or longer, the AF continuation determination unit 103 determines to continue to perform the AF with respect to the first object 90A, the second object 90B, and the third object 90C. Further, for example, in a case where time during which the first object position, the second object position, and the third object position are within the depth of field is equal to or longer than the third default time, the AF continuation determination unit 103 determines to continue to perform the AF with respect to the first object 90A, the second object 90B, and the third object 90C.

The AF continuation determination unit 103 may perform the determination based on a condition other than the above.

The first default time is an example of "first default time" according to the present disclosed technology, and the second default time is an example of "second default time" according to the present disclosed technology.

The AF continuation determination unit 103 determines whether or not the first object position is within the depth of field, whether or not the second object position is within the depth of field, and whether or not the third object position is within the depth of field based on the first object distance obtained from the first distance data 82A, the second object distance obtained from the second distance data 82B, the third object distance obtained from the third distance data 82C, the near point distance calculated by using Equation (5), and the far point distance calculated by using Equation (6).

Further, the AF continuation determination unit 103 determines the length between the depth of field and the default range based on the depth of field calculated by using Equation (2). Further, the AF continuation determination unit 103 determines whether the both ends inter-object distance is shorter or longer than the length of the depth of field based on the both ends inter-object distance, which is obtained from the first distance data 82A, the second distance data 82B and the third distance data 82C, and the depth of field calculated by using Equation (2).

Further, the AF continuation determination unit 103 acquires the image data 81 obtained by being imaged through the image sensor 20, first feature image data stored in the NVM 64 and/or the RAM 66 (see FIG. 2) in advance as representing the feature of the second object 90B, and second feature image data stored in the NVM 64 and/or the RAM 66 (see FIG. 2) in advance as representing a feature of the third object 90C. The AF continuation determination unit 103 determines whether or not the second object position is out of the imaging range by using a so-called template matching method. That is, the AF continuation determination unit 103 determines whether or not the second object position is out of the imaging range based on whether or not the first feature image data is included in the image data 81. Further, similarly, the AF continuation determination unit 103 determines whether or not the third object position is out of the imaging range by using a so-called template matching method. That is, the AF continuation determination unit 103 determines whether or not the third object position is out of the imaging range based on whether or not the second feature image data is included in the image data 81. Here, although it is determined whether or not the second object position and the third object position are out of the imaging range by using the template matching method, the present disclosed technology is not limited to this, and it may be determined whether or not the second object position and/or the third object position are out of the imaging range by using a subject recognition method using AI.

The inter-object distance determination unit 104 determines whether or not the both ends inter-object distance is shorter than the length of the depth of field. More specifically, the inter-object distance determination unit 104 specifies whether the both ends inter-object distance is shorter or longer than the length of the depth of field based on the both ends inter-object distance, which is obtained from the first distance data 82A, the second distance data 82B, and the third distance data 82C, and the depth of field calculated by using Equation (2), and determines whether or not the both ends inter-object distance is shorter than the length of the depth of field based on the specification result.

The object position determination unit 107 determines whether or not the second object position and the third object position are out of the depth of field in the same direction. More specifically, the object position determination unit 107 specifies a positional relationship among the second object position, the third object position, the near point, and the far point based on the second object distance obtained from the second distance data 82B, the third object distance obtained from the third distance data 82C, the near point distance calculated by using Equation (5), and the far point distance calculated by using Equation (6), and determines whether or not the second object position and the third object position are out of the depth of field in the same direction based on the specification result.

Figure 18:
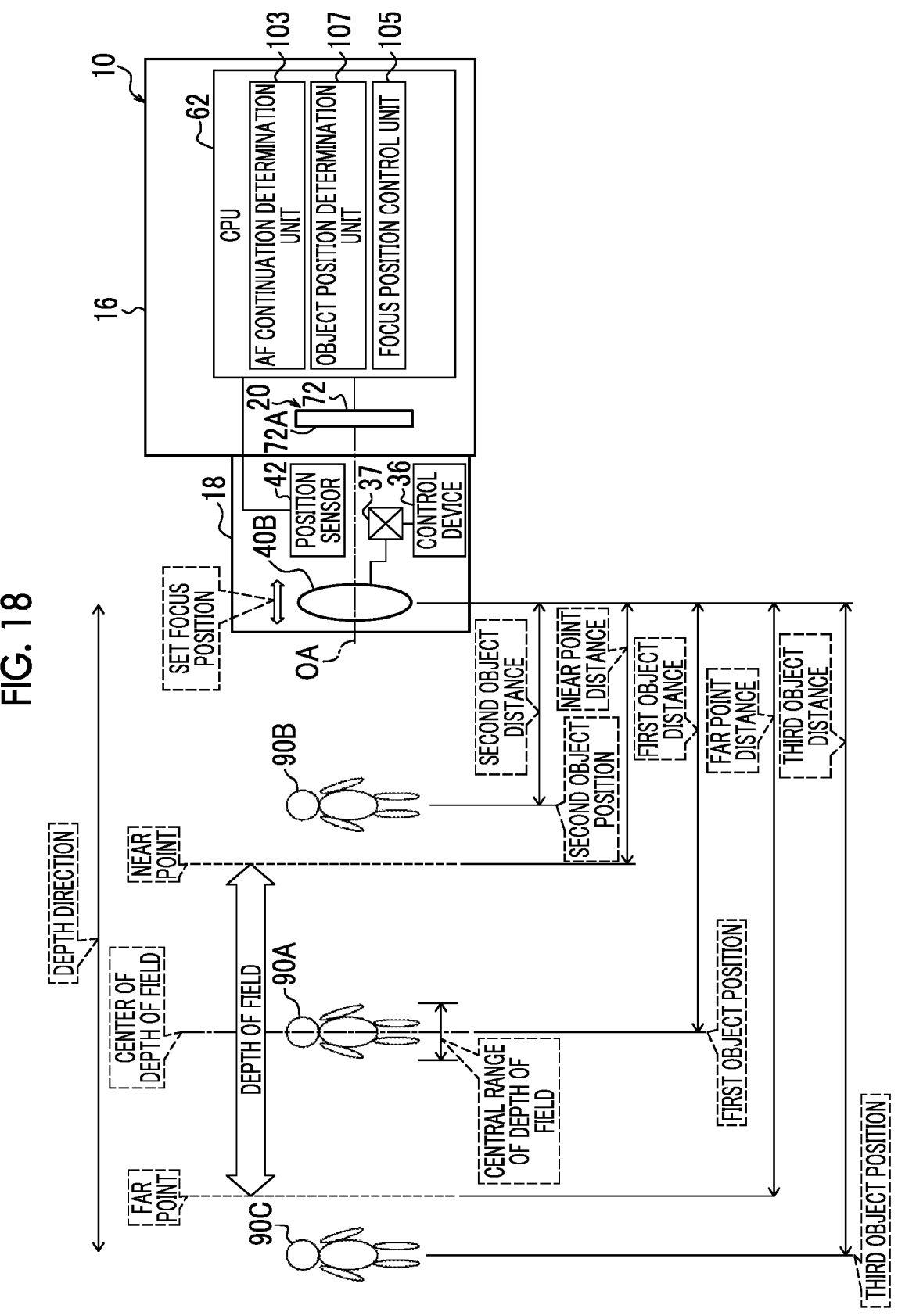
FIG. 18 is an explanatory diagram showing an example of a second operation example of the imaging apparatus according to the sixth embodiment.

As an example shown in FIG. 18, in a case where the determination is set as negative by the AF continuation determination unit 103, the focus position control unit 105 performs control of setting a focus position to a position where the first object position is within a central range of the depth of field.

In the example shown in FIG. 18, although the second object position is out of the near point side of the depth of field and the third object position is out of the far point side of the depth of field, even in a case where the second object position is out of the far point side of the depth of field and the third object position is out of the near point side of the depth of field, in a case where the determination is set as negative by the AF continuation determination unit 103, the focus position control unit 105 performs the control of setting the focus position to the position where the first object position is within the central range of the depth of field.

The focus position control unit 105 performs the control of setting the focus position to a position where the first object position is within the central range of the depth of field based on the first object distance obtained from the first distance data 82A, the near point distance calculated by using Equation (5), the far point distance calculated by using Equation (6), and a set value related to the central range of the depth of field. The central range of the depth of field is the same as that of the first embodiment.

In a case where the determination is set as negative by the AF continuation determination unit 103, the focus position control unit 105 may perform control of setting the focus position to a position where the center of the depth of field is set to the first object position.

Further, in a case where the determination is set as negative by the AF continuation determination unit 103 because the state in which the second object position and/or the third object position are out of the depth of field continues for the first default time or longer, in a case where the determination is set as negative by the AF continuation determination unit 103 because the depth of field is narrower than the default range, and in a case where the determination is set as negative by the AF continuation determination unit 103 because the second object position and/or the third object position are out of the imaging range, the focus position control unit 105 may change the length and/or a position of the central range of depth of field.

Further, the focus position control unit 105 controls the focus position according to whether or not the first object position in the depth direction based on the first distance data 82A, the second object position in the depth direction based on the second distance data 82B, and the third object position in the depth direction based on the third distance data 82C are within the depth of field.

Figure 17:
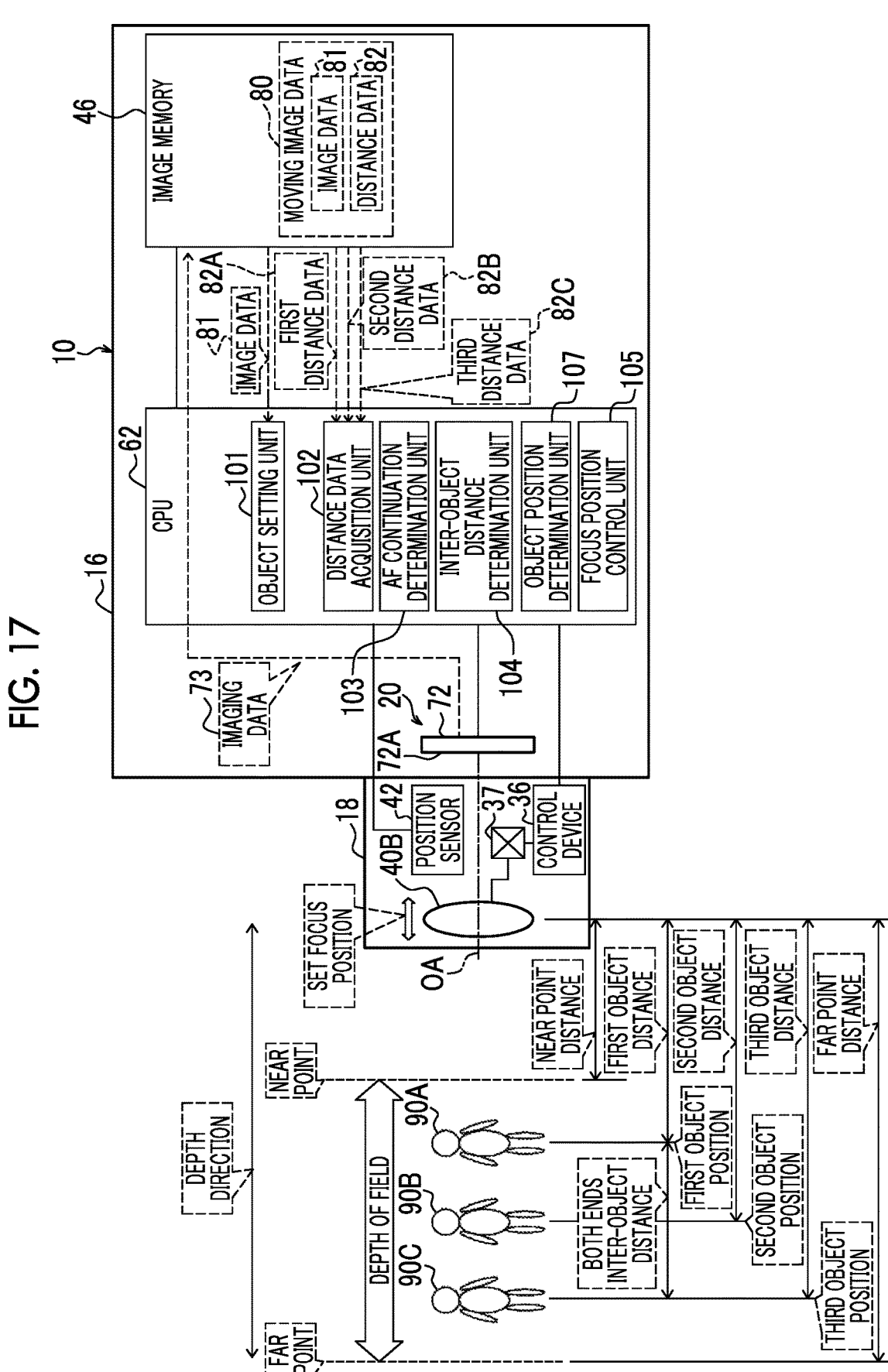
FIG. 17 is an explanatory diagram showing an example of a first operation example of the imaging apparatus according to a sixth embodiment.

As an example shown in FIG. 17, in a case where the determination is set as positive by the inter-object distance determination unit 104 because the both ends inter-object distance is shorter than the length of the depth of field, the focus position control unit 105 performs the control of setting the focus position to the position where the first object position, the second object position, and the third object position are within the depth of field.

The focus position control unit 105 performs the control of setting the focus position to the position where the first object position, the second object position, and the third object position are within the depth of field based on the first object distance obtained from the first distance data 82A, the second object distance obtained from the second distance data 82B, the third object distance obtained from the third distance data 82C, the near point distance calculated by using Equation (5), and the far point distance calculated by using Equation (6).

Figure 19:
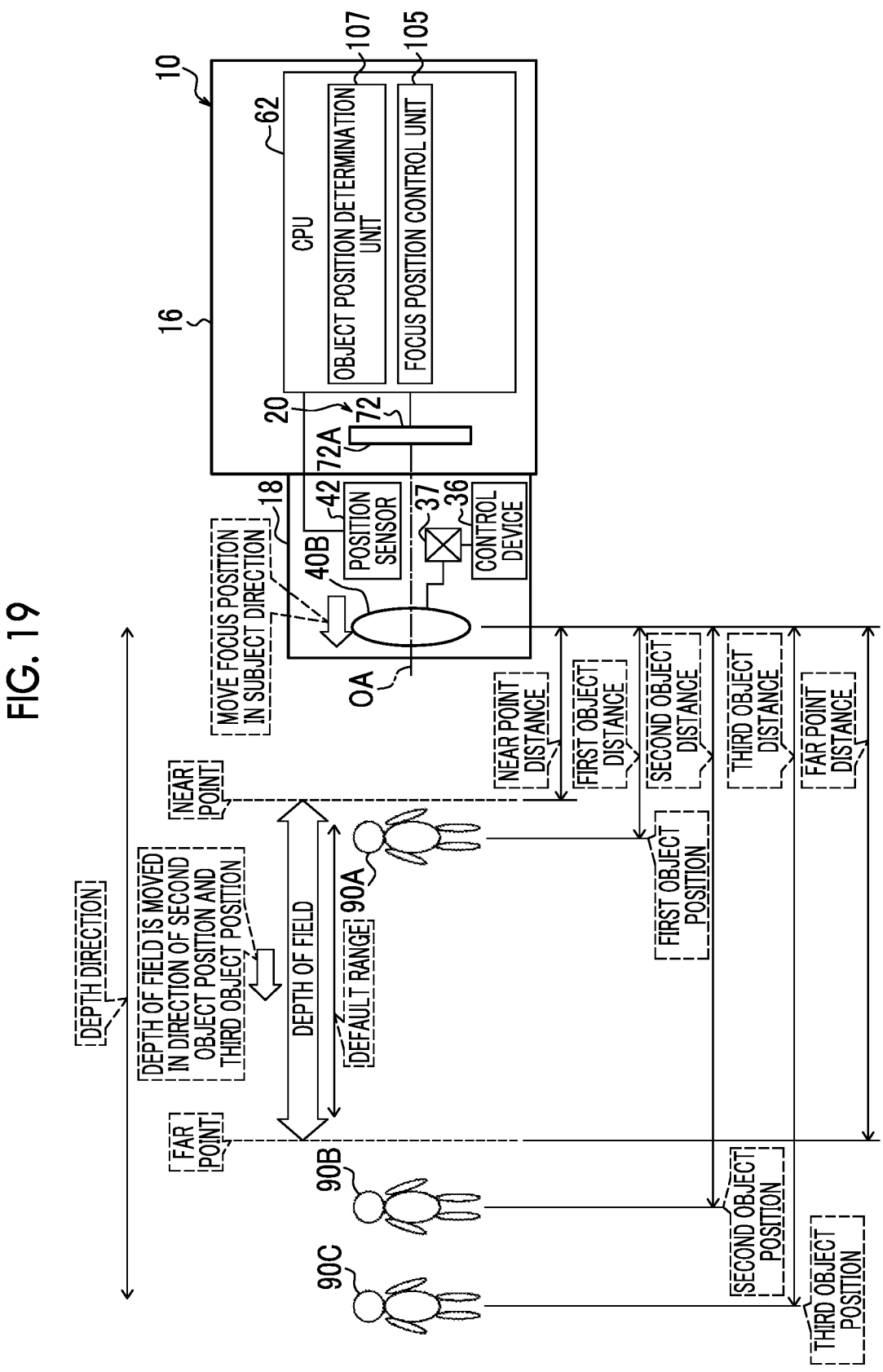
FIG. 19 is an explanatory diagram showing an example of a third operation example of the imaging apparatus according to the sixth embodiment.
Figure 20:
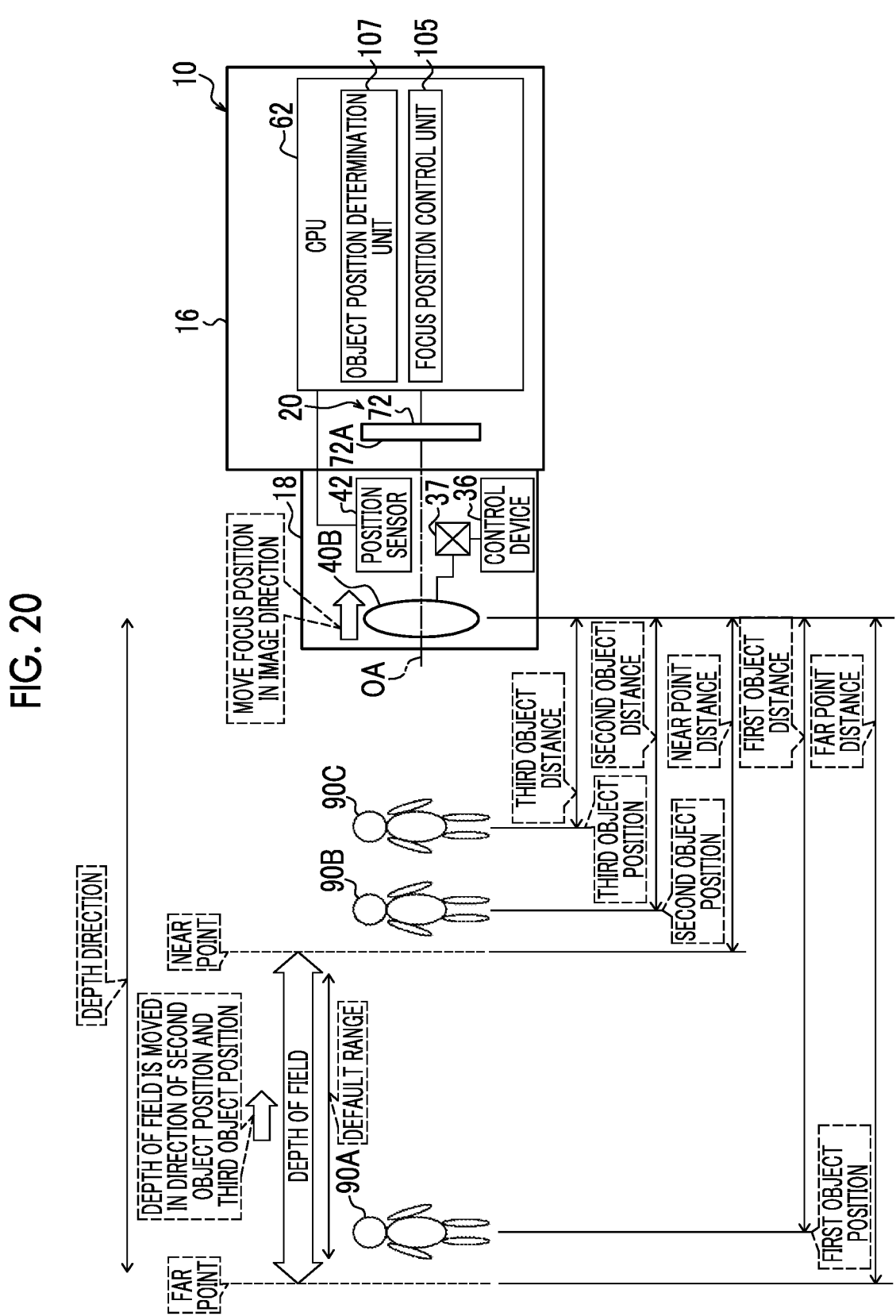
FIG. 20 is an explanatory diagram showing an example of a fourth operation example of the imaging apparatus according to the sixth embodiment.

Further, as an example shown in FIGS. 19 and 20, in a case where the determination is set as positive by the object position determination unit 107 because the second object position and the third object position are out of the depth of field in the same direction, the focus position control unit 105 performs the control of moving the focus position in the same direction as a direction in which the second object position and the third object position are out of the depth of field, within the range in which the first object position is within the depth of field.

Specifically, as an example shown in FIG. 19, in a case where the second object position and the third object position are out of the far point side of the depth of field, the focus position control unit 105 performs the control of moving the focus position in the subject direction within the range in which the first object position is within the depth of field. In a case where the control for moving the focus position in the subject direction is performed, the depth of field is moved in the direction of the second object position and the third object position, which is the same direction as the movement direction of the focus position.

Further, as an example shown in FIG. 20, in a case where the second object position and the third object position are out of the near point side of the depth of field, the focus position control unit 105 performs the control of moving the focus position in an image direction within the range in which the first object position is within the depth of field. In a case where the control for moving the focus position in the image direction is performed, the depth of field is moved in the direction of the second object position and the third object position, which is the same direction as the movement direction of the focus position.

The focus position control unit 105 performs the control of moving the focus position in the same direction as the direction in which the second object position and the third object position are out of the depth of field within the range in which the first object position is within the depth of field based on the first object distance obtained from the first distance data 82A, the second object distance obtained from the second distance data 82B, the third object distance obtained from the third distance data 82C, the near point distance calculated by using Equation (5), and the far point distance calculated by using Equation (6).

The focus position control unit 105 may perform the control of moving the focus position in the same direction as the direction in which the second object position and the third object position are out of the depth of field within the range in which the first object position is within the default range that is narrower than the depth of field. The default range is the same as that of the first embodiment.

In this case, the focus position control unit 105 performs the control of moving the focus position in the same direction as the direction in which the second object position and the third object position are out of the depth of field within the range in which the first object position is within the default range based on the first object distance obtained from the first distance data 82A, the second object distance obtained from the second distance data 82B, the third object distance obtained from the third distance data 82C, the near point distance calculated by using Equation (5), the far point distance calculated by using Equation (6), and the set value related to the default range of the depth of field.

In the examples shown in FIGS. 19 and 20, the direction in which the second object position and the third object position are out of the depth of field and the direction in which the focus position is moved are examples of a "second direction" according to the present disclosed technology.

Further, as an example shown in FIG. 18, in a case where the determination is set as negative by the object position determination unit 107 because the second object position and the third object position are out of the depth of field in mutually different directions, the focus position control unit 105 performs the control of setting the focus position to the position where the first object position is within the central range of the depth of field.

In the example shown in FIG. 18, although the second object position is out of the near point side of the depth of field and the third object position is out of the far point side of the depth of field, even in a case where the second object position is out of the far point side of the depth of field and the third object position is out of the near point side of the depth of field, the focus position control unit 105 performs the control of setting the focus position to the position where the first object position is within the central range of the depth of field in the same manner as described above.

In the example shown in FIG. 18, the direction in which the second object position is out of the depth of field is an example of a "third direction" according to the present disclosed technology, and the direction in which the third object position is out of the depth of field is an example of a "fourth direction" according to the present disclosed technology.

The focus position control unit 105 performs the control of setting the focus position to a position where the first object position is within the central range of the depth of field based on the first object distance obtained from the first distance data 82A, the near point distance calculated by using Equation (5), the far point distance calculated by using Equation (6), and a set value related to the central range of the depth of field. The central range of the depth of field is the same as that of the first embodiment. The central range is an example of a "fourth central range" according to the present disclosed technology.

In a case where the determination is set as negative by the object position determination unit 107, the focus position control unit 105 may perform control of setting the focus position to a position where the center of the depth of field is set to the first object position.

Further, in a case where the determination is set as negative by the AF continuation determination unit 103 and in a case where the determination is set as negative by the object position determination unit 107, the focus position control unit 105 may change the length and/or position of the central range of depth of field.

Next, an action of the imaging apparatus 10 according to the sixth embodiment will be described with reference to FIG. 21. FIG. 21 shows an example of a flow of the focus position control processing according to the sixth embodiment. The focus position control processing shown in FIG. 21 is executed, for example, during the display of the live view image before an imaging instruction is provided through the release button 22 in the AF mode.

In the focus position control processing shown in FIG. 21, first, in step S31, the object setting unit 101 sets the first object 90A to be focused in a plurality of objects included in the moving image indicated by the image data 81 based on the image data 81 included in the moving image data 80.

In step S32, the object setting unit 101 sets the second object 90B to be focused on a plurality of objects included in the moving image indicated by the image data 81.

In step S33, the object setting unit 101 sets the third object 90C to be focused on a plurality of objects included in the moving image indicated by the image data 81.

In step S34, the distance data acquisition unit 102 acquires the first distance data 82A related to the first object 90A from the distance data 82 included in the moving image data 80.

In step S35, the distance data acquisition unit 102 acquires the second distance data 82B related to the second object 90B from the distance data 82 included in the moving image data 80.

In step S36, the distance data acquisition unit 102 acquires the third distance data 82C related to the third object 90C from the distance data 82 included in the moving image data 80.

In step S37, the AF continuation determination unit 103 determines whether or not to continue to perform the AF with respect to the first object 90A, the second object 90B, and the third object 90C. In step S37, in a case where the AF continuation determination unit 103 does not continue to perform the AF with respect to the first object 90A, the second object 90B, and the third object 90C, the determination is set as negative, and the processing shown in FIG. 21 shifts to step S38. In step S37, in a case where the AF continuation determination unit 103 continues to perform the AF with respect to the first object 90A, the second object 90B, and the third object 90C, the determination is set as positive, and the processing shown in FIG. 21 shifts to step S39.

In step S38, the focus position control unit 105 performs the control of setting the focus position to the position where the first object position is within the central range of the depth of field. In this case, the focus position control unit 105 may perform the control of setting the focus position to the position where the center of the depth of field is set to the first object position.

In step S39, the inter-object distance determination unit 104 determines whether or not the both ends inter-object distance is shorter than the length of the depth of field. In step S39, in a case where the both ends inter-object distance is shorter than the length of the depth of field, the determination is set as positive, and the processing shown in FIG. 21 shifts to step S40. In step S39, in a case where the both ends inter-object distance is equal to or longer than the length of the depth of field, the determination is set as negative, and the processing shown in FIG. 21 shifts to step S41.

In step S40, the focus position control unit 105 performs the control of setting the focus position to the position where the first object position, the second object position, and the third object position are within the depth of field.

In step S41, the object position determination unit 107 determines whether or not the second object position and the third object position are out of the depth of field in the same direction. In step S41, in a case where the second object position and the third object position are out of the depth of field in the same direction, the determination is set as positive, and the processing shown in FIG. 21 shifts to step S42. In step S41, in a case where the second object position and the third object position are not out of the depth of field in the same direction, the determination is set as negative, and the processing shown in FIG. 21 shifts to step S43.

In step S42, the focus position control unit 105 performs the control of moving the focus position in the same direction as the direction in which the second object position and the third object position are out of the depth of field within the range in which the first object position is within the depth of field.

In step S43, the focus position control unit 105 performs the control of setting the focus position to the position where the first object position is within the central range of the depth of field. In this case, the focus position control unit 105 may perform the control of setting the focus position to the position where the center of the depth of field is set to the first object position.

After the processing of step S38 is executed, the processing shown in FIG. 21 is ended. The imaging method described as the action of the imaging apparatus 10 described above is an example of an "imaging method" according to the present disclosed technology.

As described above, in the imaging apparatus 10 according to the sixth embodiment, in a case where the second object position and the third object position are out of the depth of field in the same direction, the CPU 62 performs the control of moving the focus position in the same direction as the direction in which the second object position and the third object position are out of the depth of field within the range in which the first object position is within the depth of field. Therefore, for example, in a case where the first object 90A, the second object 90B, and the third object 90C are imaged, a sudden change in a focus state can be suppressed even in a case where the second object 90B and/or the third object 90C are moved in the depth direction.

Further, in a case where the second object position and the third object position are out of the depth of field in mutually different directions, the CPU 62 performs control of setting the focus position to the position where the first object position is within the central range of the depth of field. Therefore, it is possible to focus on the first object 90A.

In a case where each of the second object 90B and the third object 90C is an aggregate of the plurality of objects and the second object position and the third object position are out of the depth of field in mutually different directions, the focus position may be moved in the direction of the object, among the second object 90B and the third object 90C, having a larger number of individual objects within the range in which the first object position is within the depth of field.

Further, the focus position may be changed in a case where the second object 90B and the third object 90C are positioned on the near point side with respect to the first object 90A, or in a case where the second object 90B and the third object 90C are positioned on the far point side with respect to the first object 90A.

Seventh Embodiment

As an example shown in FIGS. 22 and 23, in a seventh embodiment, the configuration of the imaging apparatus 10 is changed as follows with respect to the first embodiment.

That is, in a case where the first object position is within the depth of field, the AF continuation determination unit 103 determines whether or not the second object position is out of the depth of field. Further, the CPU 62 operates as a stop amount control unit 108, in addition to the object setting unit 101, the distance data acquisition unit 102, the AF continuation determination unit 103, the inter-object distance determination unit 104, and the focus position control unit 105.

In a case where the determination is set as negative by the AF continuation determination unit 103 because, for example, the second object position is out of the depth of field, the stop amount control unit 108 performs control of increasing the depth of field by changing the stop amount.

The performance of the control of increasing the depth of field by changing the stop amount means that the CPU 62 increases the depth of field by driving the third actuator 39 via the control device 36 to change the size of the opening 40D1 of the stop 40D. In this case, the stop amount control unit 108 may perform control of changing the stop amount to an amount in which the first object position and the second object position are within the depth of field, as an example of the control of increasing the depth of field by changing the stop amount. Accordingly, as an example shown in FIG. 23, the depth of field is increased, and the first object position and the second object position are within the depth of field.

Figure 22:
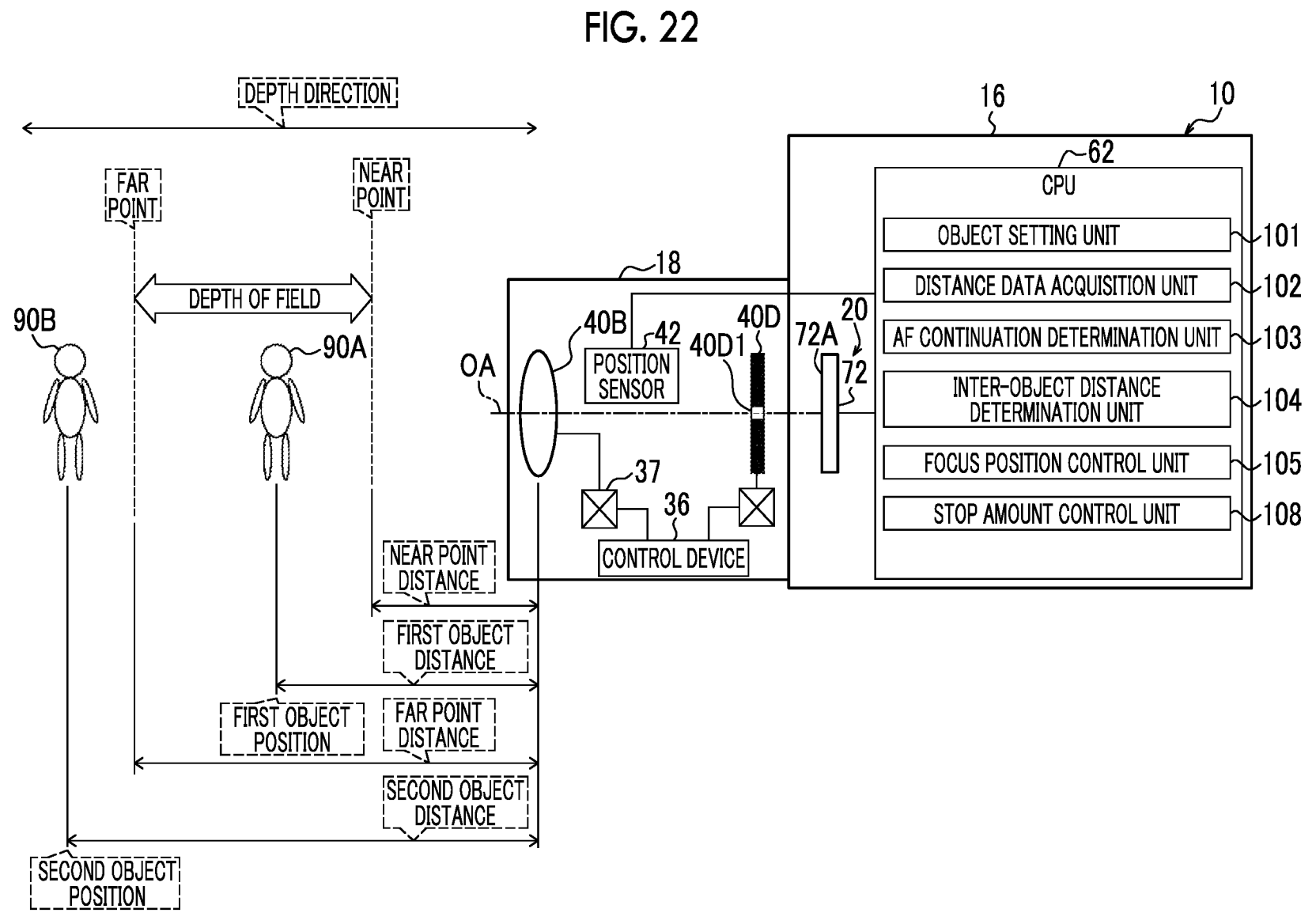

In the example shown in FIG. 22, although the second object position is out of the far point side of the depth of field, even in a case where the second object position is out of the near point side of the depth of field, in a case where the determination is set as negative by the AF continuation determination unit 103, the stop amount control unit 108 performs the control of increasing the depth of field by changing the stop amount.

The stop amount control unit 108 performs the control of changing the stop amount to an amount in which the first object position and the second object position are within the depth of field based on the first object distance obtained from the first distance data 82A, the second object distance obtained from the second distance data 82B, the near point distance calculated by using Equation (5), and the far point distance calculated by using Equation (6).

Figure 24:
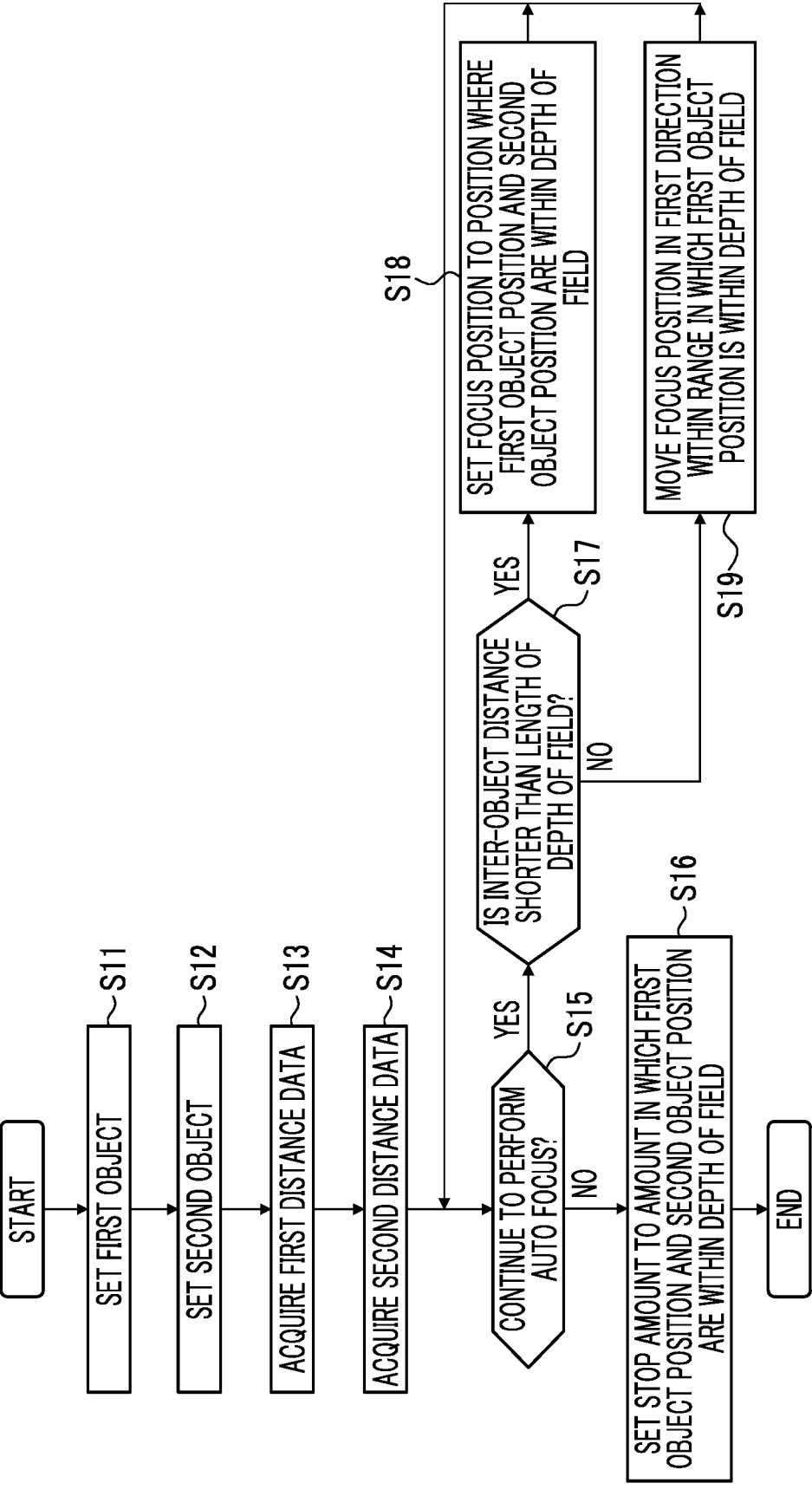
FIG. 24 is a flowchart showing an example of a flow of the focus position control processing executed by the CPU according to the seventh embodiment.

Next, an action of the imaging apparatus 10 according to the seventh embodiment will be described with reference to FIG. 24. FIG. 24 shows an example of a flow of the focus position control processing according to the seventh embodiment. In the focus position control processing shown in FIG. 24, the processing contents of steps S15 and S16 are different from that of the focus position control processing according to the first embodiment.

In step S15, in a case where the first object position is within the depth of field, the AF continuation determination unit 103 determines whether or not the second object position is out of the depth of field. In step S15, in a case where the second object position is out of the depth of field, the determination is set as positive, and the processing shown in FIG. 24 shifts to step S17. In step S15, in a case where the second object position is not out of the depth of field, the determination is set as negative, and the processing shown in FIG. 24 shifts to step S16.

In step S16, the stop amount control unit 108 performs the control of increasing the depth of field by changing the stop amount. In this case, the stop amount control unit 108 may perform control of changing the stop amount to an amount in which the first object position and the second object position are within the depth of field, as an example of the control of increasing the depth of field by changing the stop amount. After the processing in step S16 is executed, the processing shown in FIG. 24 is ended.

As described above, in the imaging apparatus 10 according to the second embodiment, in a case where the second object position is out of the depth of field, the CPU 62 performs the control of increasing the depth of field by changing the stop amount. Therefore, for example, in a case where the first object 90A and the second object 90B are imaged, a sudden change in a focus state can be suppressed even in a case where the second object 90B is moved in the depth direction.

Further, the control of increasing the depth of field by changing the stop amount may be control of changing the stop amount to an amount in which the first object position and the second object position are within the depth of field. In this case, the first object position and the second object position can be within the depth of field.

In a case where the inter-object distance is equal to or longer than the length of the depth of field, according to the exposure, the depth of field may be increased by changing the stop amount within a range in which a gain and/or a photoelectric conversion efficiency of the image sensor 20 are equal to or lower than an upper limit.

Further, in a case where the moving image data 80 is generated based on the imaging data 73 obtained by being imaged at a high frame rate, the depth of field may be increased by changing the stop amount within a range in which a default light amount is ensured.

Although the first to seventh embodiments have been described above, the above-described embodiments and the modification examples can be combined with each other as long as no inconsistency occurs. Further, in a case where the above-described embodiments and the modification examples are combined and there are a plurality of overlapping steps, priorities may be given to the plurality of steps according to various conditions and the like.

Further, in the above embodiment, although the CPU 62 is exemplified, at least one other CPU, at least one GPU, and/or at least one TPU may be used instead of the CPU 62 or together with the CPU 62.

Further, in the above embodiment, although an example of the embodiment in which the program 65 is stored in the NVM 64 has been described, the present disclosed technology is not limited to this. For example, the program 65 may be stored in a portable non-temporary storage medium such as an SSD or a USB memory. The program 65 stored in the non-temporary storage medium is installed in the controller 12 of the imaging apparatus 10. The CPU 62 executes the focus position control processing according to the program 65.

Further, the program 65 may be stored in the storage device such as another computer or a server device connected to the imaging apparatus 10 via the network, the program 65 may be downloaded in response to the request of the imaging apparatus 10, and the program 65 may be installed in the controller 12.

It is not necessary to store all of the programs 65 in the storage device such as another computer or a server device connected to the imaging apparatus 10, or the NVM 64, and a part of the program 65 may be stored.

Further, although the imaging apparatus 10 shown in FIGS. 1 and 2 has a built-in controller 12, the present disclosed technology is not limited to this, for example, the controller 12 may be provided outside the imaging apparatus 10.

Further, in the above embodiment, although the controller 12, which includes the CPU 62, NVM 64, and RAM 66, is exemplified, the present disclosed technology is not limited to this, and a device including an ASIC, FPGA, and/or PLD may be applied instead of the controller 12. Further, instead of the controller 12, a combination of a hardware configuration and a software configuration may be used.

Further, as a hardware resource for executing the focus position control processing described in the embodiment, the following various processors can be used. Examples of the processors include a CPU which is a general-purpose processor functioning as the hardware resource for executing the focus position control processing by executing software, that is, a program. Further, examples of the processor include a dedicated electric circuit, which is a processor having a circuit configuration specially designed for executing specification processing such as FPGA, PLD, or ASIC. A memory is built in or connected to any processor, and any processor executes the focus position control processing by using the memory.

The hardware resource for executing the focus position control processing may be composed of one of these various processors, or may be composed of a combination (for example, a combination of a plurality of FPGAs or a combination of a CPU and an FPGA) of two or more processors of the same type or different types. In addition, the hardware resource for executing the focus position control processing may be one processor.

As a configuring example of one processor, first, there is a form in which one processor is composed of a combination of one or more CPUs and software and the processor functions as the hardware resource for executing the focus position control processing. Secondly, as represented by SoC, there is a form in which a processor that realizes the functions of the entire system including a plurality of hardware resources for executing the focus position control processing with one IC chip is used. As described above, the focus position control processing is realized by using one or more of the various processors as the hardware resources.

Further, as the hardware-like structure of these various processors, more specifically, an electric circuit in which circuit elements such as semiconductor elements are combined can be used. In addition, the focus position control processing described above is merely an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

What is claimed is:

1. An imaging apparatus comprising:
an image sensor; and
a processor,
wherein the processor is configured to:
acquire first distance data related to a distance between the imaging apparatus and a first object included in a moving image, which is shown by moving image data obtained by being imaged by the image sensor, and second distance data related to a distance between the imaging apparatus and a second object included in the moving image;
control a focus position according to whether or not a first object position in a depth direction based on the first distance data and a second object position in the depth direction based on the second distance data are within a depth of field; and
in a case where the first object position and the second object position are within the depth of field, perform control of associating the focus position with the first object position on a condition in which a distance between the first object position and a default end of the depth of field is equal to or shorter than a default distance.

2. The imaging apparatus according to claim 1,
wherein the processor is configured to, in a case where the second object position is out of the depth of field in a first direction, perform control of moving the focus position in the first direction within a range in which the first object position is within the depth of field.

3. The imaging apparatus according to claim 1,
wherein the processor is configured to, in a case where the first object position and the second object position are within the depth of field, perform control of setting the focus position to a position where a position between the first object position and the second object position is within a first central range of the depth of field.

4. The imaging apparatus according to claim 3,
wherein the position between the first object position and the second object position is a central position between the first object position and the second object position.

5. The imaging apparatus according to claim 1,
wherein the processor is configured to, in a case where the first object position and the second object position are within the depth of field, perform control of setting the focus position to a position where a focusing position is set to a position between the first object position and the second object position.

6. The imaging apparatus according to claim 5,
wherein the position between the first object position and the second object position is a central position between the first object position and the second object position.

7. The imaging apparatus according to claim 1,
wherein the processor is configured to, in a case where a state in which the second object position is out of the depth of field continues for first default time or longer, perform control of setting the focus position to a position where the first object position is within a second central range of the depth of field.

8. The imaging apparatus according to claim 1,
wherein the processor is configured to, in a case where the depth of field is narrower than a default range, perform control of setting the focus position to a position where the first object position is within a third central range of the depth of field.

9. An imaging apparatus comprising:
an image sensor; and
a processor,
wherein the processor is configured to:
acquire first distance data related to a distance between the imaging apparatus and a first object included in a moving image, which is shown by moving image data obtained by being imaged by the image sensor, and second distance data related to a distance between the imaging apparatus and a second object included in the moving image;
control a focus position according to whether or not a first object position in a depth direction based on the first distance data and a second object position in the depth direction based on the second distance data are within a depth of field; and
in a case where a state in which the second object position is out of the depth of field and a state in which a distance between the first object position and the second object position is shorter than a length of the depth of field continue for second default time or longer, perform control of setting the focus position to a position where the first object position and the second object position are within the depth of field.

10. The imaging apparatus according to claim 1,
wherein the processor is configured to set an object, in which a default condition is satisfied among a plurality of objects specified from the moving image data, as the first object.

11. The imaging apparatus according to claim 10,
wherein the default condition is a condition in which an instruction is given from an outside or is a condition in which detection is made as a default object by performing detection processing.

12. The imaging apparatus according to claim 1,
wherein the processor is configured to:
acquire third distance data related to a distance between the imaging apparatus and a third object included in the moving image; and in a case where the second object position and a third object position in the depth direction based on the third distance data are out of the depth of field in a second direction, perform control of moving the focus position in the second direction within a range in which the first object position is within the depth of field.

13. The imaging apparatus according to claim 12, wherein the processor is configured to, in a case where the second object position is out of the depth of field in a third direction and the third object position is out of the depth of field in a fourth direction, perform control of setting the focus position to a position where the first object position is within a fourth central range of the depth of field.

14. The imaging apparatus according to claim 1, wherein the processor is configured to, in a case where the second object position is out of the depth of field, perform control of increasing the depth of field by changing a stop amount.

15. The imaging apparatus according to claim 14, wherein the control of increasing the depth of field by changing the stop amount is control of changing the stop amount to an amount in which the first object position and the second object position are within the depth of field.

16. The imaging apparatus according to claim 1, wherein the processor is configured to acquire the first distance data and the second distance data based on imaging data output from the image sensor.

17. The imaging apparatus according to claim 16, wherein the image sensor includes a plurality of phase difference pixels, and
the processor is configured to acquire the first distance data and the second distance data based on phase difference pixel data, of the imaging data, output from the phase difference pixels.

18. The imaging apparatus according to claim 17, wherein the phase difference pixel is a pixel for selectively outputting non-phase difference pixel data and the phase difference pixel data,
the non-phase difference pixel data is pixel data obtained by performing photoelectric conversion in an entire region of the phase difference pixels, and the phase difference pixel data is pixel data obtained by performing the photoelectric conversion in a partial region of the phase difference pixels.

19. An imaging method comprising:
acquiring first distance data related to a distance between an imaging apparatus and a first object included in a moving image, which is shown by moving image data obtained by being imaged by an image sensor, and second distance data related to a distance between the imaging apparatus and a second object included in the moving image;
controlling a focus position according to whether or not a first object position in a depth direction based on the first distance data and a second object position in the depth direction based on the second distance data are within a depth of field; and
in a case where the first object position and the second object position are within the depth of field, perform control of associating the focus position with the first object position on a condition in which a distance between the first object position and a default end of the depth of field is equal to or shorter than a default distance.

20. An imaging method comprising:
acquiring first distance data related to a distance between an imaging apparatus and a first object included in a moving image, which is shown by moving image data obtained by being imaged by an image sensor, and second distance data related to a distance between the imaging apparatus and a second object included in the moving image;
controlling a focus position according to whether or not a first object position in a depth direction based on the first distance data and a second object position in the depth direction based on the second distance data are within a depth of field; and
in a case where a state in which the second object position is out of the depth of field and a state in which a distance between the first object position and the second object position is shorter than a length of the depth of field continue for second default time or longer, perform control of setting the focus position to a position where the first object position and the second object position are within the depth of field.

* * * * *